US008700682B2

(12) United States Patent
Tedder et al.

(10) Patent No.: US 8,700,682 B2
(45) Date of Patent: Apr. 15, 2014

(54) SYSTEMS, METHODS AND ARTICLES FOR TEMPLATE BASED GENERATION OF MARKUP DOCUMENTS TO ACCESS BACK OFFICE SYSTEMS

(75) Inventors: Doug Tedder, Portland, ME (US); Paul Corriveau, Portland, ME (US); John Kushiner, Harpswell, ME (US)

(73) Assignee: Vertafore, Inc., Bothell, WA (US)

( * ) Notice: Subject to any disclaimer, the term of this patent is extended or adjusted under 35 U.S.C. 154(b) by 558 days.

(21) Appl. No.: 12/647,235

(22) Filed: Dec. 24, 2009

(65) Prior Publication Data
US 2011/0161375 A1 Jun. 30, 2011

(51) Int. Cl.
G06F 7/00 (2006.01)
G06F 17/30 (2006.01)

(52) U.S. Cl.
USPC ............................ 707/809; 707/810; 707/811

(58) Field of Classification Search
USPC .......................................... 707/809, 810, 811
See application file for complete search history.

(56) References Cited

U.S. PATENT DOCUMENTS

| | | | |
|---|---|---|---|
| 3,970,992 A | 7/1976 | Boothroyd et al. |
| 4,346,442 A | 8/1982 | Musmanno |
| 4,347,568 A | 8/1982 | Giguere et al. |
| 4,359,631 A | 11/1982 | Lockwood et al. |
| 4,383,298 A | 5/1983 | Huff et al. |
| 4,410,940 A | 10/1983 | Carlson et al. |
| 4,429,360 A | 1/1984 | Hoffman et al. |
| 4,486,831 A | 12/1984 | Wheatley et al. |
| 4,491,725 A | 1/1985 | Pritchard |
| 4,503,499 A | 3/1985 | Mason et al. |
| 4,553,206 A | 11/1985 | Smutek et al. |
| 4,567,359 A | 1/1986 | Lockwood |
| 4,591,974 A | 5/1986 | Dornbush et al. |
| 4,598,367 A | 7/1986 | DeFrancesco et al. |
| 4,633,430 A | 12/1986 | Cooper |
| 4,642,768 A | 2/1987 | Roberts |
| 4,646,229 A | 2/1987 | Boyle |
| 4,646,231 A | 2/1987 | Green et al. |
| 4,646,250 A | 2/1987 | Childress |
| 4,648,037 A | 3/1987 | Valentino |

(Continued)

FOREIGN PATENT DOCUMENTS

| | | |
|---|---|---|
| CA | 2646167 A1 | 10/2007 |
| CA | 2649441 A1 | 10/2007 |

(Continued)

OTHER PUBLICATIONS

"AMS Real-Time Getting Started Guide," AMS Services,Vertafore, Inc., 9 pages, 2008.

(Continued)

Primary Examiner — Mariela Reyes
(74) Attorney, Agent, or Firm — Seed IP Law Group PLLC

(57) ABSTRACT

An abstraction layer is provided between databases of back office systems and a markup language based interface, which may allow Web access to data in the databases of the back office systems. Schemas, metadata and validation files are generated from an intermediary representation of the database, which may be flat, non-hierarchical files. Markup language based templates may be generated based on the schemas, metadata and validation files. Markup documents or "markup" may be generated using the templates and the schemas, metadata and validation files. Workflow may be defined and imposed on the generation of the markup.

38 Claims, 13 Drawing Sheets

(56) References Cited

U.S. PATENT DOCUMENTS

| | | |
|---|---|---|
| 4,658,351 A | 4/1987 | Teng |
| 4,730,252 A | 3/1988 | Bradshaw |
| 4,794,515 A | 12/1988 | Hornung |
| 4,809,170 A | 2/1989 | Leblang et al. |
| 4,819,156 A | 4/1989 | DeLorme et al. |
| 4,831,526 A | 5/1989 | Luchs et al. |
| 4,845,644 A | 7/1989 | Anthias et al. |
| 4,860,247 A | 8/1989 | Uchida et al. |
| 4,912,628 A | 3/1990 | Briggs |
| 4,918,588 A | 4/1990 | Barrett et al. |
| 4,928,243 A | 5/1990 | Hodges et al. |
| 4,928,252 A | 5/1990 | Gabbe et al. |
| 4,949,251 A | 8/1990 | Griffin et al. |
| 4,951,194 A | 8/1990 | Bradley et al. |
| 4,959,769 A | 9/1990 | Cooper et al. |
| 4,985,831 A | 1/1991 | Dulong et al. |
| 5,072,412 A | 12/1991 | Henderson, Jr. et al. |
| 5,086,502 A | 2/1992 | Malcolm |
| 5,159,669 A | 10/1992 | Trigg et al. |
| 5,161,226 A | 11/1992 | Wainer |
| 5,170,480 A | 12/1992 | Mohan et al. |
| 5,175,853 A | 12/1992 | Kardach et al. |
| 5,201,033 A | 4/1993 | Eagen et al. |
| 5,220,665 A | 6/1993 | Coyle, Jr. et al. |
| 5,241,677 A | 8/1993 | Naganuma et al. |
| 5,257,375 A | 10/1993 | Clark et al. |
| 5,261,099 A | 11/1993 | Bigo et al. |
| 5,263,134 A | 11/1993 | Paal et al. |
| 5,265,159 A | 11/1993 | Kung |
| 5,282,052 A | 1/1994 | Johnson et al. |
| 5,317,733 A | 5/1994 | Murdock |
| 5,363,214 A | 11/1994 | Johnson |
| 5,448,729 A | 9/1995 | Murdock |
| 5,517,644 A | 5/1996 | Murdock |
| 5,530,861 A | 6/1996 | Diamant et al. |
| 5,537,315 A | 7/1996 | Mitcham |
| 5,553,282 A | 9/1996 | Parrish et al. |
| 5,583,922 A | 12/1996 | Davis et al. |
| 5,634,052 A | 5/1997 | Morris |
| 5,864,340 A | 1/1999 | Bertram et al. |
| 5,880,724 A | 3/1999 | Bertram et al. |
| 5,968,125 A | 10/1999 | Garrick et al. |
| 6,049,877 A | 4/2000 | White |
| 6,065,026 A | 5/2000 | Cornelia et al. |
| 6,128,653 A | 10/2000 | del Val et al. |
| 6,199,079 B1 | 3/2001 | Gupta et al. |
| 6,247,020 B1 | 6/2001 | Minard |
| 6,271,846 B1 | 8/2001 | Martinez et al. |
| 6,272,678 B1 | 8/2001 | Imachi et al. |
| 6,301,592 B1 | 10/2001 | Aoyama et al. |
| 6,366,920 B1 | 4/2002 | Hoose et al. |
| 6,377,948 B2 | 4/2002 | Kikuchi et al. |
| 6,381,744 B2 | 4/2002 | Nanos et al. |
| 6,385,642 B1 | 5/2002 | Chlan et al. |
| 6,393,407 B1 | 5/2002 | Middleton, III et al. |
| 6,405,238 B1 | 6/2002 | Votipka |
| 6,407,752 B1 | 6/2002 | Harnett |
| 6,430,575 B1 | 8/2002 | Dourish et al. |
| 6,437,803 B1 | 8/2002 | Panasyuk et al. |
| 6,463,343 B1 | 10/2002 | Emens et al. |
| 6,490,601 B1 | 12/2002 | Markus et al. |
| 6,510,430 B1 | 1/2003 | Oberwager et al. |
| 6,538,667 B1 | 3/2003 | Duursma et al. |
| 6,546,405 B2 | 4/2003 | Gupta et al. |
| 6,592,629 B1 | 7/2003 | Cullen et al. |
| 6,601,047 B2 | 7/2003 | Wang et al. |
| 6,658,167 B1 | 12/2003 | Lee et al. |
| 6,658,659 B2 | 12/2003 | Hiller et al. |
| 6,915,435 B1 | 7/2005 | Merriam |
| 6,918,082 B1 | 7/2005 | Gross et al. |
| 6,978,376 B2 | 12/2005 | Giroux et al. |
| 6,993,529 B1 | 1/2006 | Basko et al. |
| 6,993,661 B1 | 1/2006 | Garfinkel |
| 7,010,503 B1 | 3/2006 | Oliver et al. |
| 7,020,779 B1 | 3/2006 | Sutherland |
| 7,146,495 B2 | 12/2006 | Baldwin et al. |
| 7,178,110 B2 | 2/2007 | Fujino |
| 7,206,998 B2 | 4/2007 | Pennell et al. |
| 7,266,537 B2 | 9/2007 | Jacobsen et al. |
| 7,299,202 B2 | 11/2007 | Swanson |
| 7,299,502 B2 | 11/2007 | Schmeling et al. |
| 7,318,193 B2 | 1/2008 | Kim et al. |
| 7,321,539 B2 | 1/2008 | Ballantyne |
| 7,322,025 B2 | 1/2008 | Reddy et al. |
| 7,372,789 B2 | 5/2008 | Kuroda |
| 7,421,438 B2 | 9/2008 | Turski et al. |
| 7,440,967 B2 * | 10/2008 | Chidlovskii ............ 1/1 |
| 7,574,048 B2 | 8/2009 | Shilman et al. |
| 7,584,196 B2 | 9/2009 | Reimer et al. |
| 7,587,327 B2 | 9/2009 | Jacobs et al. |
| 7,593,532 B2 | 9/2009 | Plotkin et al. |
| 7,624,189 B2 | 11/2009 | Bucher |
| 7,636,898 B2 | 12/2009 | Takahashi |
| 7,650,320 B2 | 1/2010 | Nakano |
| 7,676,792 B2 | 3/2010 | Irie et al. |
| 7,698,230 B1 | 4/2010 | Brown et al. |
| 7,757,168 B1 | 7/2010 | Shanahan et al. |
| 7,996,759 B2 | 8/2011 | Elkady |
| 8,140,589 B2 | 3/2012 | Petri |
| 8,166,388 B2 | 4/2012 | Gounares et al. |
| 8,370,403 B2 | 2/2013 | Matsuki |
| 8,438,045 B2 | 5/2013 | Erlanger |
| 8,458,582 B2 | 6/2013 | Rogers et al. |
| 2001/0027420 A1 | 10/2001 | Boublik et al. |
| 2001/0032092 A1 | 10/2001 | Calver |
| 2002/0065879 A1 | 5/2002 | Ambrose et al. |
| 2002/0120474 A1 | 8/2002 | Hele et al. |
| 2002/0138476 A1 | 9/2002 | Suwa et al. |
| 2002/0194033 A1 | 12/2002 | Huff |
| 2002/0194578 A1 | 12/2002 | Irie et al. |
| 2002/0198743 A1 | 12/2002 | Ariathurai et al. |
| 2003/0101200 A1 | 5/2003 | Koyama et al. ............ 707/200 |
| 2003/0144887 A1 | 7/2003 | Debber |
| 2003/0191938 A1 | 10/2003 | Woods et al. |
| 2003/0212610 A1 | 11/2003 | Duffy et al. |
| 2004/0039757 A1 | 2/2004 | McClure |
| 2004/0059740 A1 | 3/2004 | Hanakawa et al. |
| 2004/0186750 A1 | 9/2004 | Surbey et al. |
| 2004/0193455 A1 | 9/2004 | Kellington |
| 2005/0071203 A1 | 3/2005 | Maus |
| 2005/0080804 A1 | 4/2005 | Bradshaw, Jr. et al. |
| 2005/0097061 A1 | 5/2005 | Shapiro et al. ............ 705/67 |
| 2005/0137928 A1 | 6/2005 | Scholl et al. |
| 2005/0144195 A1 | 6/2005 | Hesselink et al. ............ 707/201 |
| 2005/0185636 A1 | 8/2005 | Bucher |
| 2006/0100912 A1 | 5/2006 | Kumar et al. |
| 2006/0184452 A1 | 8/2006 | Barnes et al. |
| 2006/0195491 A1 | 8/2006 | Nieland et al. |
| 2006/0195494 A1 | 8/2006 | Dietrich |
| 2006/0259524 A1 | 11/2006 | Horton |
| 2007/0006222 A1 | 1/2007 | Maier et al. |
| 2007/0016465 A1 | 1/2007 | Schaad |
| 2007/0061154 A1 | 3/2007 | Markvoort et al. ............ 705/1 |
| 2007/0067772 A1 | 3/2007 | Bustamante |
| 2007/0146823 A1 | 6/2007 | Borchers et al. |
| 2007/0186214 A1 | 8/2007 | Morgan |
| 2007/0244921 A1 | 10/2007 | Blair |
| 2007/0244935 A1 | 10/2007 | Cherkasov |
| 2007/0245230 A1 | 10/2007 | Cherkasov |
| 2007/0282927 A1 | 12/2007 | Polouetkov ............ 707/204 |
| 2008/0002830 A1 | 1/2008 | Cherkasov et al. |
| 2008/0040690 A1 | 2/2008 | Sakai |
| 2008/0091846 A1 | 4/2008 | Dang |
| 2009/0055242 A1 | 2/2009 | Rewari et al. |
| 2009/0119133 A1 | 5/2009 | Yeransian et al. |
| 2009/0328171 A1 | 12/2009 | Bayus et al. |
| 2010/0060926 A1 | 3/2010 | Smith et al. ............ 358/1.15 |
| 2010/0064230 A1 | 3/2010 | Klawitter et al. ............ 715/748 |
| 2010/0064258 A1 | 3/2010 | Gorczowski et al. ............ 715/841 |
| 2010/0064375 A1 | 3/2010 | Gorczowski et al. ............ 726/28 |
| 2010/0076993 A1 | 3/2010 | Klawitter et al. ............ 707/769 |
| 2010/0091317 A1 | 4/2010 | Williams et al. ............ 358/1.15 |
| 2010/0161616 A1 | 6/2010 | Mitchell |
| 2010/0179883 A1 | 7/2010 | Devolites |

(56) References Cited

U.S. PATENT DOCUMENTS

| | | | |
|---|---|---|---|
| 2010/0191785 A1 | 7/2010 | Serlet et al. | |
| 2011/0145037 A1 | 6/2011 | Domashchenko et al. | |
| 2011/0153560 A1 | 6/2011 | Bryant et al. | 707/610 |
| 2011/0173153 A1 | 7/2011 | Domashchenko et al. | |
| 2011/0283177 A1 | 11/2011 | Gates et al. | |
| 2012/0150919 A1 | 6/2012 | Brown et al. | |
| 2012/0232934 A1 | 9/2012 | Zhang et al. | |
| 2012/0271657 A1 | 10/2012 | Anderson et al. | |
| 2013/0024418 A1 | 1/2013 | Sitrick et al. | |
| 2013/0073942 A1 | 3/2013 | Cherkasov | |

FOREIGN PATENT DOCUMENTS

| | | | |
|---|---|---|---|
| CA | 2761405 A1 | 6/2012 | |
| CA | 2733857 A1 | 9/2012 | |
| CA | 2737734 A1 | 10/2012 | |
| EP | 0585192 A1 | 3/1994 | |
| JP | 60-41138 A | 3/1985 | |
| JP | 3-282941 A | 12/1991 | |
| JP | 4-373026 A | 12/1992 | |
| WO | 2007/120771 A2 | 10/2007 | |
| WO | 2007/120772 A2 | 10/2007 | |
| WO | 2007/120773 A2 | 10/2007 | |
| WO | 2007/120774 A2 | 10/2007 | |
| WO | 2010/030675 | 3/2010 | |
| WO | 2010/030676 | 3/2010 | |
| WO | 2010/030677 | 3/2010 | |
| WO | 2010/030678 | 3/2010 | |
| WO | 2010/030679 | 3/2010 | |
| WO | 2010/030680 | 3/2010 | |

OTHER PUBLICATIONS

"Veritas Replication Exec™ version 3.1 for Windows," Administrator's Guide, pp. i-20, 49-68, and 119-160, Dec. 2004.
Announcement, "Coming Attraction, AMS Invites you to a Special Sneak Preview," AMS Services, 1 page, Aug. 1, 2008.
Brochure, "AMS 360—Business Growth. Productivity. Proven Technology.," Vertafore, Inc., 8 pages, 2008.
Corriveau et al., "AMS Portal Server: Bridging the Gap Between Web Presentation and the Back Office," White Paper, AMS Services, 13 pages, 2008.
Non-final Office Action mailed Feb. 14, 2012, in U.S. Appl. No. 12/641,843, 14 pages.
Amendment filed May 11, 2012, in U.S. Appl. No. 12/641,843, 24 pages.
Final Office Action mailed Jul. 19, 2012, in U.S. Appl. No. 12/641,843, 17 pages.
"Update insurance template according to changes in policy," retrieved from https://www.google.com/?tbm=pts, on Sep. 24, 2012, 2 pages.
"Adobe Introduces Adobe Acrobat 3.0 Software," *PR Newswire*, Jun. 3, 1996, 3 pages.
"CoreData Inc. Announces Technology and Marketing Agreement with MobileStar Network Corp.," *Business Wire*, Aug. 26, 1998, 2 pages.
"CoreData Offers E-mail Connectivity for RemoteWorx," *Newsbytes News Network*, Sep. 18, 1998, 1 page.
"Free Sticky Notes software—Sticky Notes program MoRUN. net Sticker Lite," Jan. 11, 2006, retrieved from http://web.archive.org/web/20060112031435/http://www.sticky-notes.net/free/stickynotes.html, on Oct. 10, 2013, 2 pages.
"Internet lifts servers to 64 bits," *Electronic Engineering Times*, Dec. 23, 1996, 3 pages.
"NotesPlusPlus," Feb. 25, 2006, retrieved from http://web.archive.org/web/20060225020405/http://www.sharewareconnection.com/notesplusplus.htm, on Oct. 10, 2013, 2 pages.
"SPSS Unveils Aggressive Development Plans: 1999 Product Releases Will Focus on Scalability and Deployment Solutions for the Enterprise," *Business Wire*, Feb. 18, 1999, 3 pages.
"Windows XP: The Complete Reference: Using Files and Folders," Apr. 28, 2004, retrieved from http://web.archive.org/web/20040428222156/http://delltech.150m.com/XP/files/7.htm, on Oct. 10, 2013, 4 pages.
Brown et al., "Agency Management System and Content Management System Integration," U.S. Appl. No. 61/422,090, filed Dec. 10, 2010, 54 pages.
Extended European Search Report, dated Jul. 9, 2012, for Application No. 07755347.7, 8 pages.
Extended European Search Report, dated Jun. 14, 2012, for Application No. 07755348.5, 8 pages.
Extended European Search Report, dated Jun. 19, 2012, for Application No. 07755349.3, 8 pages.
Extended European Search Report, dated Jun. 14, 2012, for Application No. 07755350.1, 9 pages.
Fogel, "Open Source Development With CVS," Copyright 1999, 2000, retrieved from http://web.archive.org/web/20000815211634/http://cvsbook.red-bean.com/cvsbook.ps, on Oct. 10, 2013, 218 pages.
Gadia, "A Homogeneous Relational Model and Query Languages for Temporal Databases," *ACM Transactions on Database Systems* 13(4):418-448, Dec. 1988.
Gage, "Sun's 'objective' is to populate Java networks," *Computer Reseller News*, Apr. 15, 1996, p. 69, 2 pages.
International Search Report and Written Opinion, mailed Aug. 5, 2008, for PCT/US2007/009040, 7 pages.
International Search Report and Written Opinion, mailed Jul. 18, 2008, for PCT/US2007/009041, 8 pages.
International Search Report and Written Opinion, mailed Jul. 14, 2008, for PCT/US2007/009042, 6 pages.
International Search Report and Written Opinion, mailed Jul. 18, 2008, for PCT/US2007/009043, 9 pages.
Murdock, "Office Automation System for Data Base Management and Forms Generation," U.S. Appl. No. 07/471,290, filed Jan. 26, 1990, 163 pages.
Snodgrass et al., "Temporal Databases," IEEE Computer, Sep. 1986, pp. 35-42.
Snyder et al., "Apparatus, Method and Article to Automate and Manage Communications in a Networked Environment," U.S. Appl. No. 13/451,139, filed Apr. 19, 2012, 70 pages.
Snyder et al., "Apparatus, Method and Article to Automate and Manage Communications to Multiple Entities in a Networked Environment," U.S. Appl. No. 13/451,168, filed Apr. 19, 2012, 82 pages.
Snyder et al., "Apparatus, Method and Article to Automate and Manage Electronic Documents in a Networked Environment," U.S. Appl. No. 13/451,136, filed Apr. 19, 2012, 80 pages.
Snyder et al., "Apparatus, Method and Article to Provide an Insurance Workflow Management System," U.S. Appl. No. 13/598,297, filed Aug. 29, 2012, 86 pages.

\* cited by examiner

SYSTEMS, METHODS AND ARTICLES FOR TEMPLATE BASED GENERATION OF MARKUP DOCUMENTS TO ACCESS BACK OFFICE SYSTEMS

BACKGROUND

1. Technical Field

This disclosure relates to providing markup language based access to back office systems, for instance Web based access to legacy systems commonly found throughout the insurance industry which do not have native browser functionality, and to implementing workflows in such environments.

2. Description of the Related Art

Access to business functionality via the Worldwide Web portion of the Internet is becoming an increasing necessity in today's competitive business climate. However many business systems, particularly back office or back-end systems, do not have native browser-based capabilities and thus do not support Web access.

Such has been a particular problem in the insurance industry, where various back office or back-end systems are employed. These back office or back-end systems take a variety of forms, including agency management systems, policy administrations systems, and rate quoting systems. Often these back office or back-end systems are legacy systems, lacking any Web or markup language based interface or native browser functionality.

Previous approaches have implemented individual and separate Web user interfaces for accessing data from respective ones of various back office or back-end systems. An example of such an approach is the PhoenixDirect® interface, a Vertafore product. The PhoenixDirect® interface provides a Web front end for a Phoenix® policy administration system. The PhoenixDirect® interface is tightly coupled to the specific back office system (i.e., Phoenix® policy administration system). The PhoenixDirect® interface is not sufficiently flexible to provide a single Web user interface for other back office or back-end systems. The PhoenixDirect® interface is also not sufficiently flexible to synchronize the Web user interface with changes to the back office or back-end system.

Such tightly tailored approaches that essentially require the building of a specific interface for each back office or back end system are of course time intensive and inefficient. Such also places undue burdens on the Web developers. Different skill sets are typically required to build and provide support for Web-based systems, as compared to back office or back-end systems. In traditional development environment, Web developers must understand the business process offered by the back office or back-end systems. This results in longer development times, a greater use of resources than is desirable, increases the likelihood of errors, and increases development costs.

An improved approach of providing markup language based access, for example Web access, to back office or back end systems is desirable.

BRIEF SUMMARY

As described in detail herein, an abstraction layer may be provided between a back office or back-end system and a markup language based interface such as a Web interface. The abstraction layer may advantageously allow each entity to focus on the area they understand best. For example, a business analyst may focus on grouping fields from the back office or back-end system for display on the Web, creating markup language based templates that define the placement of required data elements, specifying workflows that define relationships between templates, and specifying rules associated with data and workflow validation. A Web developer may focus on presenting the information in a pleasing fashion, without needing to understand any portion of the back office or back-end system. Such a tool based approach may provide for a very rapid implementation of Web user interfaces for back office or back-end systems. Such may also provide an efficient approach to synchronizing a Web interface with changes to the back office or back-end system.

A run time engine may build markup documents or files using markup language based templates, and may manage the gathering and validation of data within a context of a workflow. Plug-in data providers may provide access to data on back office or back-end systems, making use of generated schema, metadata and validation files that describe a database schema of the back office or back-end system.

A method of operating at least one computer system may be summarized as including transforming a schema to an intermediate representation by at least one processor; transforming the intermediate representation of the schema to a markup language based schema by at least one processor; transforming the intermediate representation of the schema to a number of metadata files by at least one processor; transforming the intermediate representation of the schema to a number of validation files by at least one processor; and generating a number of markup language templates by at least one processor based at least in part on the markup language based schema, the metadata files and the validation files.

Transforming a schema to an intermediate representation may include transforming at least one of a relational database or a Web Service to the intermediate representation of a number of selected elements of the relational database or the Web Service. Transforming a schema to an intermediate representation may include: identifying a number of existing relationships between a number of selected tables and views of a relational database by at least one processor; iterating through a number of table, view, and column relationships by at least one processor; and producing the intermediate representation of the table, view, and column relationships for selected ones of the tables, views and columns of the relational database by at least one processor. Transforming a schema to an intermediate representation may further include: receiving a number of signals indicative of a plurality of user selections of the selected tables and views of the relational database; and receiving a number of signals indicative of a plurality of user selections of the selected columns of the relational database. Transforming a schema to an intermediate representation may further include: at least one of deleting one of the relationships, modifying one of the relationships or creating a new relationship by at least one processor. Transforming a schema to an intermediate representation may further include: serializing the intermediate representation by at least one processor; and persisting the intermediate representation by at least one processor. Transforming an intermediate representation to a markup language based schema may include: creating by at least one processor an XML schema file having a root node; iterating through the intermediate representation by at least one processor; adding by at least one processor a top-level complex data type to the XML schema file; recursively adding a number of child data types and a number of attributes to the top-level complex data type in the XML schema file by at least one processor; and persisting a resultant XML schema file. Transforming an intermediate representation to a markup language based schema may further include: de-serializing by at least one processor the intermediate representation if the intermediate representation has been previously stored and is available, before creating the XML schema file. Transforming a schema to an intermediate representation may include: retrieving by at least one processor a number of Web Service Definition Language schemas; selecting by at least one processor a number of schema types logically associated with respective ones of a number of selected Web Service operations of the Web Service Definition Language schemas; iterating through a number of selected sub-schemas; and producing the intermediate representation of based at least in part on the selected sub-schemas. Transforming a schema to an intermediate representation may further include: receiving a number of signals indicative of a plurality of selections of the Web Service operations. Transforming a schema to an intermediate representation may further include: serializing the intermediate representation by at least one processor; and persisting the intermediate representation by at least one processor. Transforming the intermediate representation of the schema to a number of metadata files may include: creating at least one metadata file having a root node by at least one processor; iterating through the intermediate representation by at least one processor; adding a number of data types and associated information to the at least one metadata file by at least one processor; and persisting a resultant metadata file. Transforming the intermediate representation of the schema to a number of metadata files may further include: de-serializing by at least one processor the intermediate representation if a previously created version of intermediate representation has been stored and is available, before creating the metadata file. Generating a number of markup language templates may include: receiving number of signals indicative of identities of each of a number of user selections of one or more schema, one or more pieces of metadata, and a one or more validation files to be used for creating the markup language based templates; receiving signals indicative of a number of user selections of schema elements; adding meta information for the selected schema elements including at least one of a formatting, a placement, a grouping, a label, a cardinality, an identification, a behavior, a reference link, or a classification; and persisting information to a markup language based template file defined by the schema. Transforming the intermediate representation of the schema to a number of validation files may include: creating a set of validation information from the schema the validation information indicative of semantic correctness of data. Creating a set of validation information from the schema may include: iterating through the intermediate representation of the schema by at least one processor; adding at least one data type and at least one piece of validation related information to at least one validation file by at least one processor; and persisting the at least one validation file. Creating a set of validation information from the schema may further include: de-serializing by at least one processor the intermediate representation if an stored intermediate representation is available, before creating iterating the intermediate representation. The method may further include: generating a number of markup language based files by at least one processor based at least in part on the generated markup language templates. Generating markup language based files by at least one processor based at least in part on the generated markup language templates may include: picking a markup provider that conforms to a markup provider interface; identifying a transit path context; receiving at least one piece of data, a schema, a metadata template or a runtime context; iterating through the markup language template; creating at least one markup fragment based at least in part on the iterating through the markup language template; classifying at least one markup element to be used by a consumer; formatting at least one markup element based on attributes of the template; and combining the markup elements into at least one markup language based file. Generating a number of markup language templates may be performed by a first processor during a pre-run time, and generating a number of markup language based files may be performed by second processor at a run time, the run time following the pre-run time. The method may further include: generating by at least one processor at least one business process workflow using the markup language templates. Generating at least one business process workflow using the markup language templates may include: receiving signals indicative of one or more user selections of identifying each of a number of markup language templates to be used in generating the business process workflow; receiving signals indicative of one or more user selections identifying each of a number of activities for the business process workflow; adding a template activity to the business process workflow if the user selection is indicative of a template activity; configuring a template group of the business process workflow as a logical parent and organizer of other templates if the user selection is indicative of a template group activity; configuring a non-template activity of the business process workflow if the user selection is indicative of a non-template activity; and persisting a resultant process work flow. The method may further include: initializing a business process workflow with a run time version of each of the intermediate representation of the schema, the metadata files and the validation files and a markup language file to which a set of user data will be saved; iterating through a plurality of activities of the business process work flow; generating a number of markup documents if the respective one of the activities is template related; and persisting the user data. Persisting the user data may include: parsing the markup documents and using workflow current context to determine respective locations in the markup documents for respective pieces of the user data.

A system of communicatively coupled computers may be summarized as including: at least one computer-readable storage medium that stores processor executable instructions; at least one processor that executes the processor executable instructions stored by the at least one computer-readable storage medium and which when executing the processor executable instructions implements: a schema generator that transforms a schema to an intermediate representation, transforms the intermediate representation of the schema to a markup language based schema, transforms the intermediate representation of the schema to a number of metadata files, and transforms the intermediate representation of the schema to a number of validation files; a template designer that generates a number of markup language templates based at least in part on the markup language based schema, the metadata files and the validation files; and a runtime engine that builds markup documents using at least the markup language templates.

The schema generator may transform at least one of a relation database or a Web service to the intermediate representation. The schema generator may identify a number of existing relationships between a number of selected tables and views of a relational database, iterates through a number of table, view, and column relationships, and produces the intermediate representation of the table, view, and column relationships for selected ones of the tables, views and columns of the relational database. The schema generator may allow a user to select from at least one of deleting one of the relationships, modifying one of the relationships or creating a new relationship by at least one processor. The template designer may create an XML schema file having a root node, iterate through the intermediate representation, add a top-level complex data type to the XML schema file, recursively add a number of child data types and a number of attributes to the top-level complex data type in the XML schema file; and persist a resultant XML schema file. The processor may further implement a business processor work flow generator which applies a business work flow to the markup language templates.

At least one computer-readable medium may be summarized as including storing instructions executable by at least one processor, which cause the at least one processor to provide a portal server function, by: transforming a schema to an intermediate representation by at least one processor; transforming the intermediate representation of the schema to a markup language based schema by at least one processor; transforming the intermediate representation of the schema to a number of metadata files by at least one processor; transforming the intermediate representation of the schema to a number of validation files by at least one processor; and generating a number of markup language templates by at least one processor based at least in part on the markup language based schema, the metadata files and the validation files.

Transforming a schema to an intermediate representation by at least one processor may include transforming at least one of a relational database or a Web Service to the intermediate representation of a number of selected elements of the relational database or the Web Service. Transforming a schema to an intermediate representation may include: identifying a number of existing relationships between a number of selected tables and views of a relational database, iterating through a number of table, view, and column relationships; and producing the intermediate representation of the table, view, and column relationships for selected ones of the tables, views and columns of the relational database. The instructions may further cause the processor to provide a portal server function, further by: processing a number of signals indicative of a plurality of user selections of the selected tables and views of the relational database; processing a number of signals indicative of a plurality of user selections of the selected columns of the relational database; and processing a number of signals indicative of a user selection to at least one of delete one of the relationships, modify one of the relationships or create a new relationship. Transforming an intermediate representation to a markup language based schema may include: creating by at least one processor an XML schema file having a root node; iterating through the intermediate representation by at least one processor; adding by at least one processor a top-level complex data type to the XML schema file; and recursively adding a number of child data types and a number of attributes to the top-level complex data type in the XML schema file by at least one processor. Transforming the intermediate representation of the schema to a number of metadata files may include: creating at least one metadata file having a root node by at least one processor; iterating through the intermediate representation by at least one processor; and adding a number of data types and associated information to the at least one metadata file by at least one processor. Generating a number of markup language templates may include: receiving number of signals indicative of identifies of each of a number of user selections of one or more schema, one or more pieces of metadata, and a one or more validations files to be used for creating the markup language based templates; receiving signals indicative of a number of user selections of schema elements; and adding meta information for the selected schema elements including at least one of a formatting, a placement, a grouping, a label, a cardinality, an identification, a behavior, a reference link, or a classification. Instructions may cause the processor to provide a portal server function, further by: generating by at least one processor at least one business process workflow using the markup language templates. Instructions may cause the processor to provide a portal server function, further by: initializing a business process workflow with a run time version of each of the intermediate representation of the schema, the metadata files and the validation files and a markup language file to which a set of user data will be saved; iterating through a plurality of activities of the business process work flow; and generating a number of markup documents if the respective one of the activities is template related.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computer systems, databases, and communications networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, meaning "and/or" unless the content clearly dictates otherwise.

The headings and Abstract of the Disclosure provided herein are for convenience only and do not interpret the scope or meaning of the embodiments.

Figure 1:
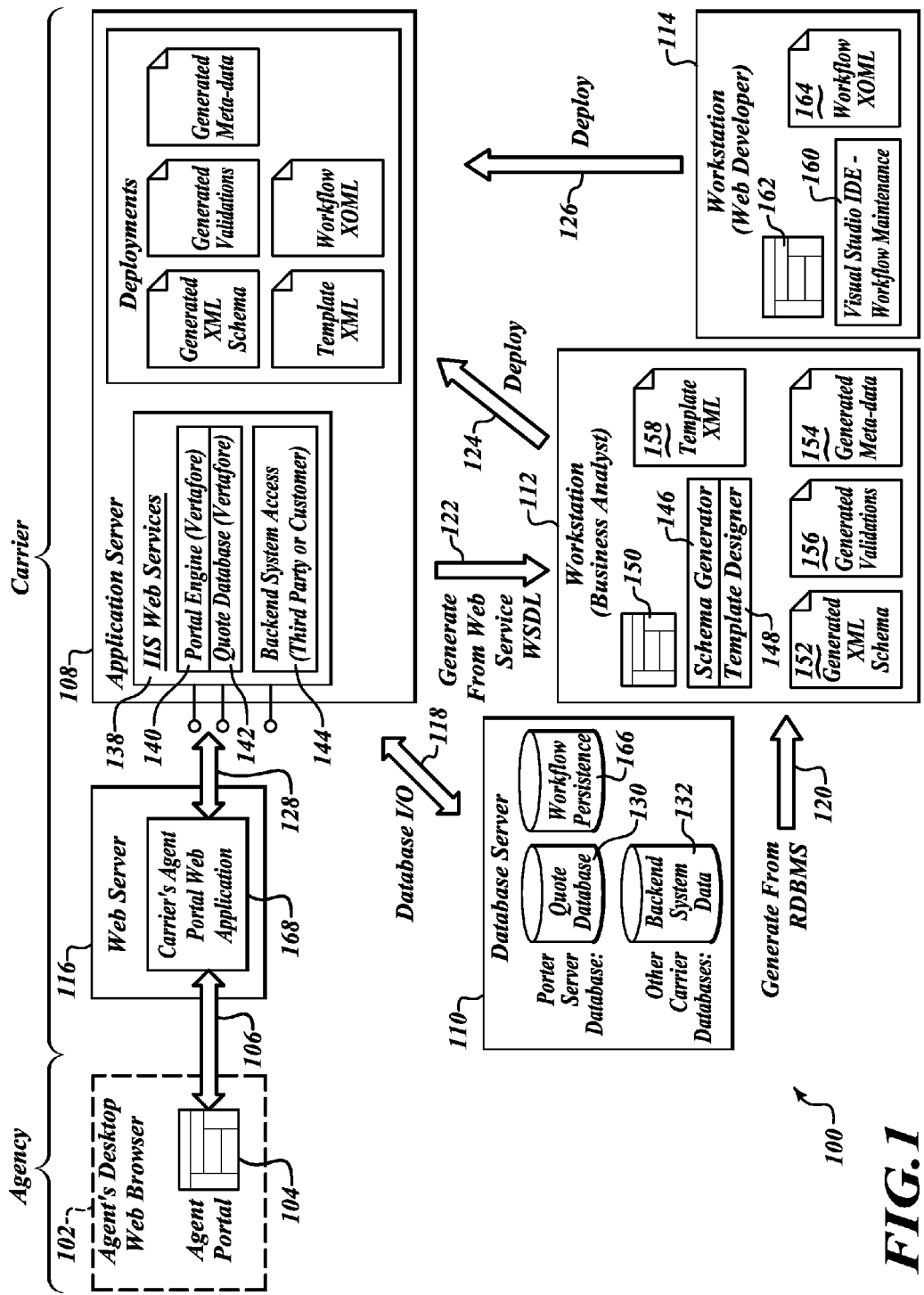
FIG. 1 is a schematic view of a networked environment according to one illustrated embodiment, the networked environment including an application server computer system, a database server computer system, a business analyst workstation computer system, a Web developer workstation computer system, a Web server and one or more client computer systems, such as an agent desktop computer system, the various computer systems communicatively linked by one or more communications networks.

FIG. 1 shows a networked environment 100 according to one illustrated embodiment.

The networked environment 100 may take a variety of forms, for example, a networked environment in which one or more client entities interact with one or more server entities. For instance, a client entity such as an insurance agency (only one illustrated) may interact with a server entity such as an insurance carrier or intermediary. In particular, personnel of the client entity employ computer systems (e.g., desktop, laptop, handheld computer systems) to retrieve information from, or to provide information to, one or more computer systems of the server entity. Thus, where the client entity is an insurance agency, the personnel may obtain information about different policies, coverage conditions, rate quotes, etc. The personnel may additionally obtain information about specific insured entities or update such information.

On the client or agency side, the networked environment 100 includes one or more agent computer systems 102. The agent computer systems 102 are associated with various agencies, for instance insurance agencies. Each of the agent computer systems executes a communications program, such as a Web browser 104. Such provides communications over one or more communications networks (double headed arrow 106), for instance the Internet or the World Wide Web (WWW) portion of the Internet. There may be one or more intermediary device between the agent computer system 102 and the rest of the network, for instance one or more server computer systems, bridges, routers, switches, and/or firewalls.

On the server or carrier side, the networked environment 100 includes an application server computer system 108, a database server computer system 110, a business analyst workstation computer system 112, a Web developer workstation computer system 114, and a Web server 116. The various computer systems 108, 110, 112, 114, 116 are communicatively linked by one or more communications networks (arrows 118, 120, 122, 124, 126, 128).

As will be apparent from the discussion herein, the application server computer system 108 and/or workstation computer systems 112, 114 perform many of the functions which provide clients such as the agent computer system 102 with access to information stored by a carrier's back office systems, for instance stored in a carrier's legacy databases. Legacy databases may take a variety of forms, for instance a quote database 130, and/or one or more backend system databases 132, such as a database associated with an agency administration system. Such legacy databases 130, 132 and/or associated back office systems may not be setup to allow querying or writing to the database via a Web interface. The application server computer system 108 operates in conjunction with the Web server computer system 116 to provide such access to the back office systems and legacy databases.

In particular, the application server computer system 108 executes a number of applications, programs or modules to implement Internet Information Services (IIS) 138 including a number of Web services. For example, the application server computer system 108 may execute a portal engine program, application or module 140 to provide portal engine Web services. Such may, for example, provide quote database Web services 142, for example including the generation and delivery of markup language documents such as HTML documents. Additionally, or alternatively, such may provide backend systems Web services 144, including the generation and delivery of markup language documents such as HTML documents.

It may be advantageous to functionally separate responsibilities involved in defining or developing the Web interface functionality. For example, development tasks requiring a knowledge of Web development may be advantageously separated from development tasks which require a knowledge of the underlying the business processes. Hence, development of various markup language templates and workflows may be split between one or more business analysts and one or more Web developers. Such is schematically represented in FIG. 1 by separate computer systems, that is a business analyst workstation computer system 112 and a separate Web developer workstation computer system 114. Of course, such advantageous separation of functions could be accomplished with the business analyst and Web developer using a single computer system. Also, while represented as single workstation computer systems 112, 114, many embodiments may employ two or more workstation computer systems for the business analysts and/or two or more workstation computer systems for the Web developers, depending on a variety of factors such as the size of the project. Further, while denominated herein as workstations, such computer systems 112, 114 may take the form of any variety of computer systems, including micro- or personnel computer systems, mini-computer systems, or even mainframe computer systems.

The business analyst workstation 112 executes a schema generator application, program or module 146 and a template designer application or module 148. Such provides a user interface, for instance a graphical user interface 150. The graphical user interface 150 that allows a user, for instance a business analyst, to specify portions of a schema for markup language template creation as well as details of various markup language templates. The schema generator and the template designer applications, programs or modules 146, 148 receive information for a relational database management system (RDBMS) such as via the database server 110 over communications network 120 and/or via Web services definition language (WSDL) over communications network 122. The schema generator application, program or module 146 generates markup language schema 152, metadata files 154, and validation files 156. The template designer application, program or module 148 generates markup language templates 158.

The Web developer workstation 114 executes one or more applications or modules, for example a workflow specification application 160. Such provides a user interface, for example, a graphical user interface 162, that allows user, for instance a Web developer, to define workflows 164. Alternatively, the business analyst workstation 112 may execute the workflow specification application 160.

Workflows 164 may specify a series of actions and/or associated screens, displays or Web documents associated with such actions to perform a given task. The workflows 164 are typically business process workflows, that is successive business process activities, actions, acts, steps or tasks taken to achieve a desired business process outcome. For instance, business process workflows may be defined to, for instance: add a new insured; create a new insurance policy; add a new agent to an agency; add a new agency; generate a price quote; process a claim; etc. Each of these business processes may involve one or more activities, actions, acts, steps or tasks, which may include collecting information from a client computer system, retrieving information from one or more of the legacy databases, and display or otherwise providing information to a requesting client computer system. The order in which the activities, actions, acts, steps or tasks occur may be defined by the business process workflow. For instance, it may be necessary to collect certain information before querying a database. The order may be specified without any branching, or in some situations may involve branching depending on certain input or selections. Such a business workflow necessarily defines an order for the various screens, displays or Web documents used to collect, retrieve or display the information.

The defined workflows 164 may be persisted in a workflow database stored on one or more computer-readable media. For example, the defined workflows may be persisted in a workflow persistence database 166 of the database server computer system 110.

In operation, the workstation computer systems 112, 114 deploy the various generated files to the application server computer system 108, for example via communications networks 124, 126. The application server computer system 108 generates markup documents or files (commonly referred to as "markup") based on generated markup based schema, metadata and validation files, markup templates and/or workflow specifications. The markup documents are provided to a requesting client, such as an agent computer system 102, via the Web server computer system 116. In particular, the Web server computer system 116 may execute a carrier's agent portal Web application, program or module 168. The carrier's agent portal Web application, program or module 168 responds to requests from various client computer systems. Such requests may be to read or otherwise access information stored by back office systems in the various legacy databases, and/or to write information to such legacy databases. Such requests may take the form of standard requests (e.g., GET, POST) under any variety of protocols, for instance the ubiquitous HTTP/IP protocol.

Figure 2:
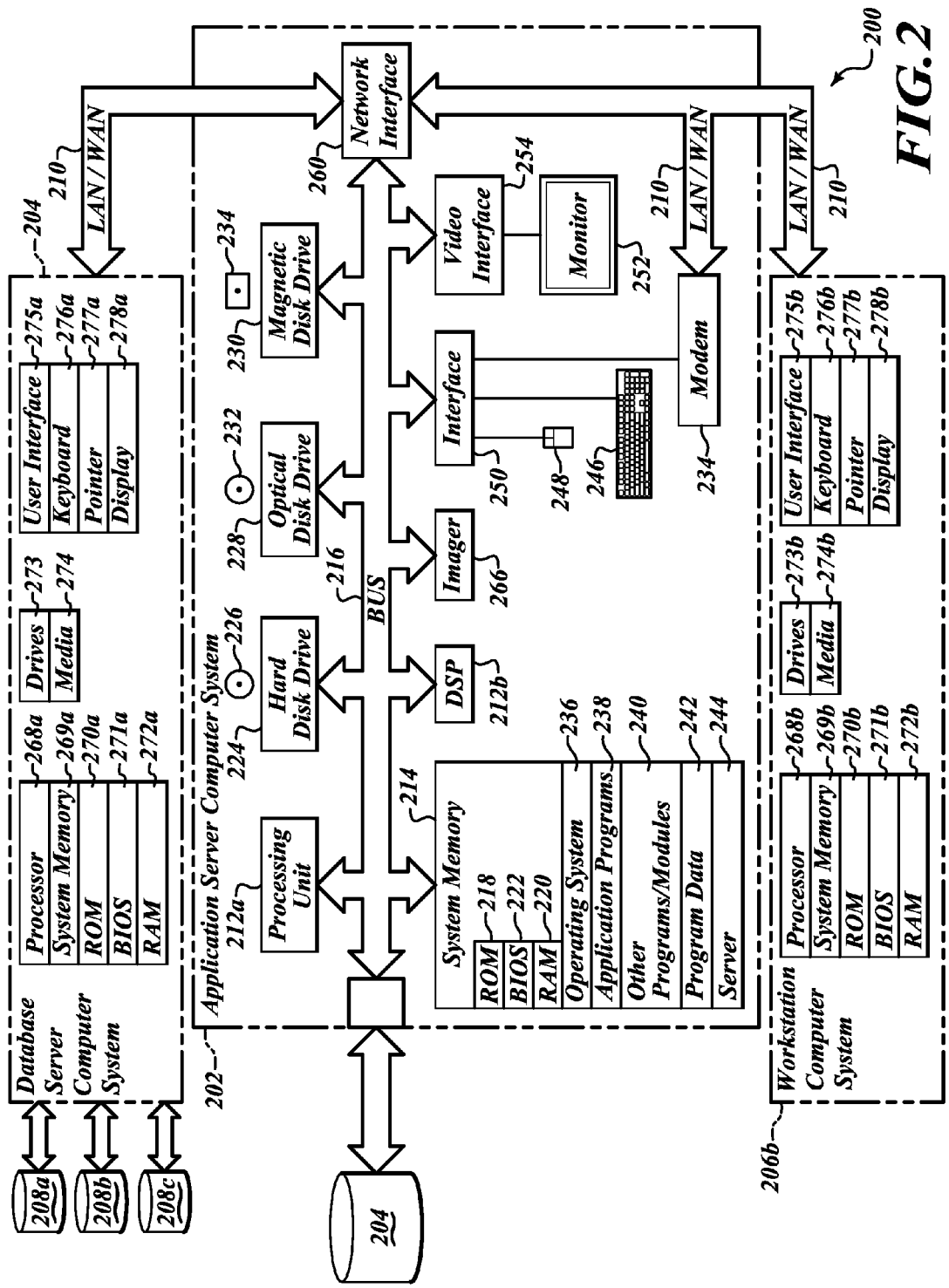
FIG. 2 is a schematic view of a portion of the networked environment of FIG. 1, showing the application server computer system, the database server computer system, and one of the workstation computer systems in further detail.

FIG. 2 is a schematic view of a portion 200 of the networked environment 100 of FIG. 1, showing an application server computer system 202, a database server computer system 204, and one of the workstation computer systems 206 in further detail.

FIG. 2 and the following discussion provide a brief, general description of a suitable networked environment 200 in which the various illustrated embodiments can be implemented. Although not required, the embodiments will be described in the general context of computer-executable instructions, such as program application modules, objects, or macros stored on computer- or processor-readable media and executed by a computer or processor. Those skilled in the relevant art will appreciate that the illustrated embodiments, as well as other embodiments, can be practiced with other system configurations and/or other computing system configurations, including hand-held devices, multiprocessor systems, microprocessor-based or programmable consumer electronics, personal computers ("PCs"), network PCs, mini computers, mainframe computers, and the like. The embodiments can be practiced in distributed computing environments where tasks or modules are performed by remote processing devices, which are linked through a communications network. In a distributed computing environment, program modules may be located in both local and remote memory storage devices or media.

FIG. 2 shows a networked environment 200 comprising one or more application server computer systems 202 (only one illustrated), one or more database server computer systems 204 (only one illustrated) and one or more workstation computer systems 206 (only one illustrated). While only one workstation computer system 206 is illustrated, the networked environment will typically include more than one workstation computer system 206, for example one or more workstation computer systems for use by one or more business analysts and/or one or more workstation computer systems for use by one or more Web developers. The computer systems 202, 204, 206 are communicatively coupled via one or more communications channels, for example on or more Wide Area Networks (WANs), Local Area Networks (LANs), parallel cables, serial cables, or wireless channels 210, each capable of high speed communications, for instance via Gigabyte Ethernet or Firewire®.

The networked environment 200 may employ other computer systems and network or communications equipment, for example additional servers, proxy servers, firewalls, routers, bridges and/or switches. While the various computer systems will at times be referred to in the singular herein, such is not intended to limit the embodiments to a single device since in typical embodiments, there may be more than one of the various computer systems. Unless described otherwise, the construction and operation of the various blocks shown in FIG. 2 are of conventional design. As a result, such blocks need not be described in further detail herein, as they will be understood by those skilled in the relevant art.

The application server computer system 202 may include one or more processing units 212a, 212b (collectively 212), a system memory 214 and a system bus 216 that couples various system components including the system memory 214 to the processing units 212. The processing units 212 may be any logic processing unit, such as one or more central processing units (CPUs) 212a, digital signal processors (DSPs) 212b, application-specific integrated circuits (ASICs), field programmable gate arrays (FPGAs), etc. The system bus 216 can employ any known bus structures or architectures, including a memory bus with memory controller, a peripheral bus, and/or a local bus. The system memory 214 includes read-only memory ("ROM") 218 and random access memory ("RAM") 220. A basic input/output system ("BIOS") 222, which can form part of the ROM 218, contains basic routines that help transfer information between elements within the application server computer system 202, such as during start-up.

The application server computer system 202 may include a hard disk drive 224 for reading from and writing to a hard disk 226, an optical disk drive 228 for reading from and writing to removable optical disks 232, and/or a magnetic disk drive 230 for reading from and writing to magnetic disks 234. The optical disk 232 can be a CD-ROM, while the magnetic disk 234 can be a magnetic floppy disk or diskette. The hard disk drive 224, optical disk drive 228 and magnetic disk drive 230 may communicate with the processing unit 212 via the system bus 216. The hard disk drive 224, optical disk drive 228 and magnetic disk drive 230 may include interfaces or controllers (not shown) coupled between such drives and the system bus 216, as is known by those skilled in the relevant art. The drives 224, 228 and 230, and their associated computer-readable media 226, 232, 234, provide nonvolatile storage of computer readable instructions, data structures, program modules and other data for the application server computer system 202. Although the depicted application server computer system 202 is illustrated employing a hard disk 224, optical disk 228 and magnetic disk 230, those skilled in the relevant art will appreciate that other types of computer-readable media that can store data accessible by a computer may be employed, such as WORM drives, RAID drives, magnetic cassettes, flash memory cards, digital video disks ("DVD"), Bernoulli cartridges, RAMs, ROMs, smart cards, etc.

Program modules can be stored in the system memory 214, such as an operating system 236, one or more application programs 238, other programs or modules 240 and program data 242.

Application programs 238 may include instructions that cause the processor(s) 212 to automatically create markup files or documents based at least in part on generated markup schema, metadata, validations, markup templates and/or workflows. Application programs 238 may include instructions that cause the processor(s) 212 to automatically provide information from and/or write information to back office systems and associated legacy databases via the markup files or documents (i.e., markup).

Other program modules 240 may include instructions for handling security such as password or other access protection and communications encryption. For example, such may automatically establish, maintain, update or record ownership information with respect to electronic or digital information or files, as well as rights, privileges, permissions or authorizations to perform various acts on such electronic or digital information or files such as reading, modifying, annotating, importing, and/or deleting information.

The system memory 214 may also include communications programs for example a server 244 that causes the application server computer system 202 to serve electronic or digital documents or files via corporate intranets, extranets, or other networks as described below. The sever 244 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. A number of suitable severs may be commercially available such as those from Mozilla, Google, Microsoft and Apple Computer.

While shown in FIG. 2 as being stored in the system memory 214, the operating system 236, application programs 238, other programs/modules 240, program data 242 and browser 244 can be stored on the hard disk 226 of the hard disk drive 224, the optical disk 232 of the optical disk drive 228 and/or the magnetic disk 234 of the magnetic disk drive 230.

An operator can enter commands and information into the application server computer system 202 through input devices such as a touch screen or keyboard 246 and/or a pointing device such as a mouse 248, and/or via a graphical user interface. Other input devices can include a microphone, joystick, game pad, tablet, scanner, etc. These and other input devices are connected to one or more of the processing units 212 through an interface 250 such as a serial port interface that couples to the system bus 216, although other interfaces such as a parallel port, a game port or a wireless interface or a universal serial bus ("USB") can be used. A monitor 252 or other display device is coupled to the system bus 216 via a video interface 254, such as a video adapter. The application server computer system 202 can include other output devices, such as speakers, printers, etc.

The application server computer system 202 can operate in a networked environment using logical connections to one or more remote computers and/or devices. For example, the application server computer system 202 can operate in a networked environment using logical connections to one or more other computer systems, for instance the database server computer system 204 and workstation computer system 206. Communications may be via a wired and/or wireless network architecture, for instance wired and wireless enterprise-wide computer networks, intranets, extranets, and/or the Internet. Other embodiments may include other types of communication networks including telecommunications networks, cellular networks, paging networks, and other mobile networks. There may be any variety of computers, switching devices, routers, bridges, switches, firewalls and other devices in the communications paths between the application server computer system 202 and the database server computer system 204 or workstation computer system 206.

The database server computer system 204 will typically take the form of a server computer that servers one or more client computers, for example the workstation computer system 206 and application server computer system 202. The database server computer system 204 may take the form of a conventional mainframe computer, mini-computer, workstation computer, personal computer (desktop or laptop), or handheld computer executing appropriate instructions. For instance, the database server computer system 204 may execute a set of server instructions to function as a server for a number of computer systems (i.e., clients) communicatively coupled via a LAN at facility or site or via a WAN across multiple facilities or sites.

The database server computer system 204 may include one or more processing units 268a, system memories 269a and a system bus (not shown) that couples various system components including the system memory 269a to the processing unit 268a. The database server computer system 204 will at times be referred to in the singular herein, but this is not intended to limit the embodiments to a single database server computer system 204 since in typical embodiments, there may be more than one database server computer system 204 or other device involved, for example to scale operation. Non-limiting examples of commercially available computer systems include, but are not limited to, an 80×86 or Pentium series microprocessor from Intel Corporation, U.S.A., a PowerPC microprocessor from IBM, a Sparc microprocessor from Sun Microsystems, Inc., a PA-RISC series microprocessor from Hewlett-Packard Company, or a 68xxx series microprocessor from Motorola Corporation.

The processing unit 268a may be any logic processing unit, such as one or more central processing units (CPUs), digital signal processors (DSPs), application-specific integrated circuits (ASICs), field programmable gate arrays (FPGAs), etc. Unless described otherwise, the construction and operation of the various blocks of the database server computer system 204 shown in FIG. 2 are of conventional design. As a result, such blocks need not be described in further detail herein, as they will be understood by those skilled in the relevant art.

The system bus can employ any known bus structures or architectures, including a memory bus with memory controller, a peripheral bus, and a local bus. The system memory 269a includes read-only memory ("ROM") 270a and random access memory ("RAM") 272a. A basic input/output system ("BIOS") 271a, which can form part of the ROM 270a, contains basic routines that help transfer information between elements within the database server computer systems 204, such as during start-up.

The database server computer system 204 may also include one or more media drives 273a, e.g., a hard disk drive, magnetic disk drive, WORM drive, and/or optical disk drive, for reading from and writing to computer-readable storage media 274a, e.g., hard disk, optical disks, and/or magnetic disks. The computer-readable storage media 274a may, for example, take the form of removable media. For example, hard disks may take the form of a Winchester drives, optical disks can take the form of CD-ROMs, while magnetic disks can take the form of magnetic floppy disks or diskettes. The media drive(s) 273a communicate with the processing unit 268a via one or more system buses. The media drives 273a may include interfaces or controllers (not shown) coupled between such drives and the system bus, as is known by those skilled in the relevant art. The media drives 273a, and their associated computer-readable storage media 274a, provide nonvolatile storage of computer readable instructions, data structures, program modules and other data for the database server computer system 204. Although described as employing computer-readable storage media 274a such as hard disks, optical disks and magnetic disks, those skilled in the relevant art will appreciate that database server computer system 204 may employ other types of computer-readable storage media that can store data accessible by a computer, such as magnetic cassettes, flash memory cards, digital video disks ("DVD"), Bernoulli cartridges, RAMs, ROMs, smart cards, etc. Data or information, for example, electronic or digital documents or files or data (e.g., metadata, ownership, authorizations) related to such can be stored in the computer-readable storage media 274a.

Program modules, such as an operating system, one or more application programs, other programs or modules and program data, can be stored in the system memory 269a. Program modules may include instructions for querying or retrieving information from certain or selected back office systems and/or legacy databases 208a-208c (collectively 208) and/or writing information to the back office systems and/or legacy databases 208. Program modules may additionally include instructions for handling security such as ownership, password or other access protection and communications encryption. In particular, the system memory 269a may include communications programs that permit the workstation computer system 206 and/or application server computer system 202 to retrieve electronic or digital documents or files from the legacy databases 208. For instance, in the case of the application server computer system 202 such may be limited based on a requester (e.g., agent, agency or agent computer system) having sufficient right, permission, privilege or authority for the requested information and/or action to be performed. The system memory 269a may also include other communications programs, for example a Web client or browser that permits the database server computer system 204 to access and exchange data with sources such as Web sites of the Internet, corporate intranets, extranets, or other networks. The browser may, for example be markup language based, such as Hypertext Markup Language (HTML), Extensible Markup Language (XML) or Wireless Markup Language (WML), and may operate with markup languages that use syntactically delimited characters added to the data of a document to represent the structure of the document.

While described as being stored in the system memory 269a, the operating system, application programs, other programs/modules, program data and/or browser can be stored on the computer-readable storage media 274a of the media drive(s) 273a. An operator can enter commands and information into the satellite node server computer system 206 via a user interface 275a through input devices such as a touch screen or keyboard 276a and/or a pointing device 277a such as a mouse. Other input devices can include a microphone, joystick, game pad, tablet, scanner, etc. These and other input devices are connected to the processing unit 269a through an interface such as a serial port interface that couples to the system bus, although other interfaces such as a parallel port, a game port or a wireless interface or a universal serial bus ("USB") can be used. A display or monitor 278a may be coupled to the system bus via a video interface, such as a video adapter. The database server computer system 204 can include other output devices, such as speakers, printers, etc.

The workstation computer systems 206 allow a user (e.g., business analyst or Web developer) to perform certain tasks such as selecting tables or other data structures to define schemas and to develop or define workflows and/or markup language based templates for automatic creation of markup language files or documents. The workstation computer systems 206 may take a variety of forms, for example a conventional workstation computer, micro- or personal computer (desktop or laptop), mini-computer, mainframe computer, or handheld computer executing appropriate instructions. For instance, the workstation computer systems 206 may execute a set of schema generator instructions to generate schema components or files, such as an intermediary form or representation of a schema, markup based schema files, metadata files or information, and/or validation files or information. The workstation computer systems 206 may execute a set of template designer instructions to generate Webpage or markup document templates. The workstation computer systems 206 may execute a set of workflow specification instructions to generate or define workflows files or information. The workstation computer systems 206 may communicate with the database server computer system 204 and the application server computer system 202 via a LAN or WAN 210.

The workstation computer systems 206 may include one or more processing units 268b, system memories 269b and a system bus (not shown) that couples various system components including the system memory 269b to the processing unit 268b. The workstation computer systems 206 will at times be referred to in the plural herein, but this is not intended to limit the embodiments to two or more workstation computer systems 206 since in some embodiments there may be a single workstation computer system 206. Non-limiting examples of commercially available computer systems include, but are not limited to, an 80×86 or Pentium series microprocessor from Intel Corporation, U.S.A., a PowerPC microprocessor from IBM, a Sparc microprocessor from Sun Microsystems, Inc., a PA-RISC series microprocessor from Hewlett-Packard Company, or a 68xxx series microprocessor from Motorola Corporation.

The processing unit 268b may be any logic processing unit, such as one or more central processing units (CPUs), digital signal processors (DSPs), application-specific integrated circuits (ASICs), field programmable gate arrays (FPGAs), etc. Unless described otherwise, the construction and operation of the various blocks of the workstation computer systems 206 shown in FIG. 2 are of conventional design. As a result, such blocks need not be described in further detail herein, as they will be understood by those skilled in the relevant art.

The system bus can employ any known bus structures or architectures, including a memory bus with memory controller, a peripheral bus, and a local bus. The system memory 269b includes read-only memory ("ROM") 270b and random access memory ("RAM") 272b. A basic input/output system ("BIOS") 271b, which can form part of the ROM 270b, contains basic routines that help transfer information between elements within the workstation computer systems 206, such as during start-up.

The workstation computer systems 206 may also include one or more media drives 273b, e.g., a hard disk drive, magnetic disk drive, WORM drive, and/or optical disk drive, for reading from and writing to computer-readable storage media 274b, e.g., hard disk, optical disks, and/or magnetic disks. The computer-readable storage media 274b may, for example, take the form of removable media. For example, hard disks may take the form of a Winchester drives, optical disks can take the form of CD-ROMs, while magnetic disks can take the form of magnetic floppy disks or diskettes. The media drive(s) 273b communicate with the processing unit 268b via one or more system buses. The media drives 273b may include interfaces or controllers (not shown) coupled between such drives and the system bus, as is known by those skilled in the relevant art. The media drives 273b, and their associated computer-readable storage media 274b, provide nonvolatile storage of computer readable instructions, data structures, program modules and other data for the workstation computer systems 206. Although described as employing computer-readable storage media 274b such as hard disks, optical disks and magnetic disks, those skilled in the relevant art will appreciate that workstation computer systems 206 may employ other types of computer-readable storage media that can store data accessible by a computer, such as magnetic cassettes, flash memory cards, digital video disks ("DVD"), Bernoulli cartridges, RAMs, ROMs, smart cards, etc. Data or information, for example, electronic or digital documents or files or data (e.g., metadata, ownership, authorizations) related to such can be stored in the computer-readable storage media 274b.

Program modules, such as an operating system, one or more application programs, other programs or modules and program data, can be stored in the system memory 269b. Program modules may include instructions that implement a user interface, for example a graphical user interface. The graphical user interface may, for example, allow users (e.g., business analysts) to select specific tables, columns, records, other data structures, or information from the legacy databases 208 to be included in a markup language template or workflow. Thus, the graphical user interface may present the various data structures in a format suitable for use by a business analyst. The graphical user interface may also, for example, allow users (e.g., business analysts, Web designers) to define workflows and/or define or format markup language templates. The program modules may include instructions that generate markup (e.g., XML, HTML, XAML) schemas, metadata files, validation data files, and markup language templates based at least in part on the intermediary representation of a schema, user selected tables, columns, records other data structures or information, as well as based on the workflows and design or formatting of templates by the Web designers. Program module may include instructions that query and/or retrieve information from the back office systems and/or legacy databases 208 via the database server 204. Such may extract information from the back office systems and/or legacy databases 208 and/or metadata regarding the structure of the various legacy databases 208 and data structures forming those databases including the various relationships between the data structures, fields or records thereof and/or the databases 208.

Program modules may additionally include instructions for handling security such as ownership, password or other access protection (e.g., right, permission, privilege or authority for the requested information and/or action to be performed) and communications encryption. The system memory 269b may also include other communications programs, for example a Web client or browser that permits the workstation computer systems 206 to access and exchange data with sources such as Web sites of the Internet, corporate intranets, extranets, or other networks. The browser may, for example be markup language based, such as Hypertext Markup Language (HTML), Extensible Markup Language (XML), Wireless Markup Language (WML) or Extensible Application Markup Language (XAML), and may operate with markup languages that use syntactically delimited characters added to the data of a document to represent the structure of the document.

While described as being stored in the system memory 269b, the operating system, application programs, other programs/modules, program data and/or browser can be stored on the computer-readable storage media 274b of the media drive(s) 273b. An operator can enter commands and information into the satellite node server computer system 206 via a user interface 275b through input devices such as a touch screen or keyboard 276b and/or a pointing device 277b such as a mouse. Other input devices can include a microphone, joystick, game pad, tablet, scanner, etc. These and other input devices are connected to the processing unit 269b through an interface such as a serial port interface that couples to the system bus, although other interfaces such as a parallel port, a game port or a wireless interface or a universal serial bus ("USB") can be used. A display or monitor 278b may be coupled to the system bus via a video interface, such as a video adapter. The database server computer system 204 can include other output devices, such as speakers, printers, etc.

Figure 3:
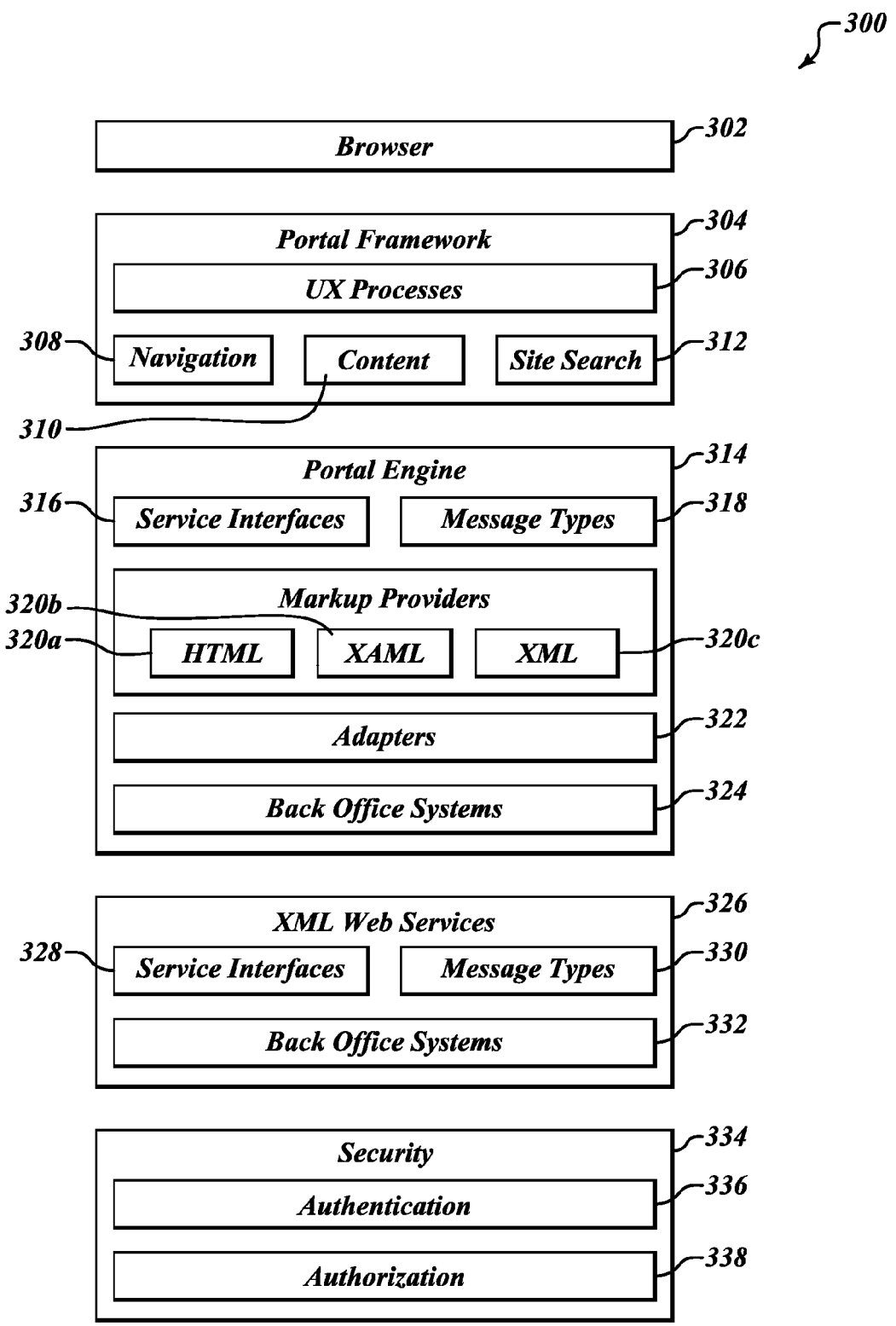
FIG. 3 is a schematic diagram showing various software modules according to one illustrated embodiments, the software modules executable by various ones of the computer systems.

FIG. 3 is a schematic diagram showing various software modules that implement a portal 300 or virtual front door according to one illustrated embodiment. The software modules are executable by various ones of the computer systems. The portal 300 may provide a single point of access to various applications and services, in a secure fashion, and with a consistent look and feel.

A browser 302 or other communications program provides a client computer system with access to the portal 300. As explained above, the browser 302 may take any variety of forms, including the various browsers that are currently commercially available.

A portal framework 304 implements user experience (UX) processes 306 and includes a navigation component 308, site search component 310, and content management component 312 and may implement security functionalities. The portal framework 304 is configurable and provides a high level of customization. The portal framework 304 may be structured semantically, like the semantic HTML. Cascading Style Sheets (CCS) may be used to control styles, fonts and color. The portal framework 304 may provide security administration, agent personalization, an agent dashboard and provisioning. The site search component 310 may implement a high-performance, scalable search engine. The search engine may be used to search portal content, for example marketing materials, PDF documents, and various other documents that may be of interest to agents or other users. The portal framework 304 may provide access to back office systems and data, for example a quote/prospect database which manages the complexity of storing, retrieving and reporting on quotes to agents. The portal framework 304 may additionally implement RSS support for RSS feeds of carrier news and notifications.

A portal engine 314 serves as the foundation of the portal 300. The portal engine 314 provides markup generation services, manages caching and workflow state, logging and exception handling. In particular, the portal engine 314 may generate semantic HTML.

The portal engine 314 includes defined service interfaces 316 and message types 318, for example consistent with the Web Services Description Language (WSDL) protocol 1.1. The portal engine 314 includes one or more markup providers (collectively 320), for example an HTML provider 320*a*, an XAML provider 320*b* and/or an XML provider 320*c*. The markup providers 320 implement interfaces and provide markup. The markup providers 320 may be loaded dynamically or on demand. The portal engine 314 also includes one or more adapters 322 for various back office or legacy systems 324. Adapters 322 implement interfaces and are responsible for the back office specifics of retrieving data from or saving data to the back office legacy systems 324. The adapters 322 may, for example, take the form of pluggable .NET assemblies that implement documented interfaces. For example, adapters 322 may include an adapter for the Phoenix® policy administration system commercially available from Vertafore, which handles rating, policy issuance, bill and claims processing. Also for example, the adapters 322 may include an adapter for the PremiumBill® agency management system commercially available from Vertafore. The adapters 322 facilitate the communication with corresponding XML Web services. The adapters 322 may, for example, map key/value pairs (i.e., query string) from the Web server 116 (FIG. 1) to the appropriate service message types, and invoke the appropriate services. The portal engine 314 can use custom adapters to implement various interfaces, allowing seamless integration with other back office systems.

An XML Web services component or module 326 provides Web services via defined service interfaces 328 and message types 330 and the back office systems 332.

A security component or module 334 may include an authentication component or module 336 and/or authorization component or module 338. The portal 300 can work with a variety of authentication modes and providers. The portal 300 can be integrated with existing authorization providers using provider specific handlers. Access may be role based, for example similar to that of the Microsoft® workflow rules engine. The portal 300 may use the Microsoft® Windows Communication Foundation (WFC) to support transport, message and mixed-mode (transport with message) security modes. Supported credential types may, for example, include Windows, Certificate, Digest, Basic, user Name, NTLM and Issue Token, as well as customized credential types. The portal 300 may use an authorization provider to handle role-based access. Such may be integrated with additional policy administration systems, applications and/or services. Roles may, for example, be mapped to LDPA groups or other organizational entities. Tasks may be associated with various roles and may be defined as read-only or write. The rules engine can further refine access, for example down to a field level or basis.

Figure 4:
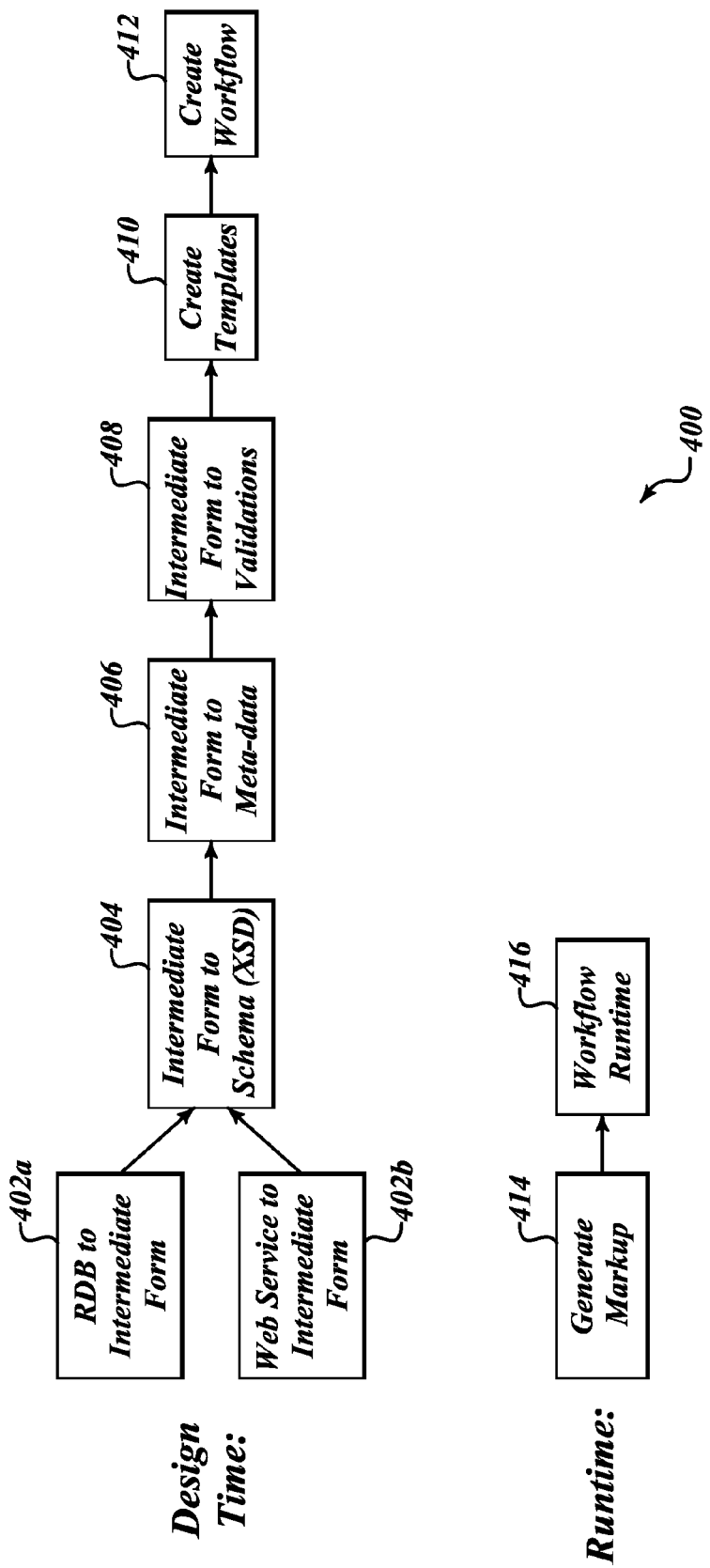
FIG. 4 is a flow diagram showing a high level method of operating one or more computer systems of a networked environment to implement a portal function that provides a Web based interface to legacy systems and databases according to one illustrated embodiment.

FIG. 4 shows a high level method 400 of operating one or more computer systems of a networked environment to implement a portal function that provides a Web based interface to legacy systems and databases, according to one illustrated embodiment. Specific operations are described in more detail with reference to FIGS. 5-13.

The method 400 can be separate into a design time portion (acts 402, 404, 406, 408, 410, 412), and a runtime portion (acts 414,416). During the design time portion, an intermediary format and output formats are created, which allow a user to create templates and workflows. During the runtime portion, markup documents are created and workflows applied. The design time portion generally occurs before the runtime, so will be described first. Notably, subsequent design time portions may occur after executing the runtime portion one or more times.

The below described approach creates XML schema, metadata and validations that are used by the rest of the method 400. Whether coming from a relational database or from a Web service definition, the information is first transformed into an intermediate format or representation. This ensures that creation of schema, metadata, and validations is performed in a consistent manner whether starting from a relational database or from a Web service definition.

A schema generator, program or module may make use of system specific plug-ins to create XML or other markup language based schema, metadata and validation files. The schema generator may examine the defined entities of an a relational database to create a single markup language schema (e.g., XML schema). The schema generator may also select related entity subsets. The schema generator may automatically read all properties associated with the selected entities, including primary and foreign keys from the relational database. The schema generator uses these to define schema hierarchy and relationships. The schema generator may allow the creation of additional constraints and relationships by a user, for example where the relational database does not contain full relational descriptions. The schema generator can use a back office system specific plug-in to capture additional lines of business (LOB) related information such as code lists and text descriptions. The plug-in may be extended to build LOB related validation files. Such validation files may capture data type, length, range, valid values of an element, and related field constraints. The schema generator can optionally create portal server markup based templates and workflow files for each LOB. These may be used as a starting point for creating markup files or documents for a particular LOB. Metadata and validation files may take the form of XML files that conform to publicly available XML schemas.

A template designer program or module facilities the otherwise daunting and time consuming task of mapping columns or fields in a database to fields in a Web form. As previously noted, the approach described herein may advantageously separate the functions of database administrator, business analyst and Web developer. The template designer program or module uses markup language based schema (e.g., XML schema) and metadata to simplify the mapping so that a business analyst can handle the task. The template designer program or module allows the design of a markup based template. The markup based template is a markup language (e.g., XML) file containing information about groups of data to be rendered into HTML, as well as the schema, metadata and validation files related to the data. The markup based template defines what data should be displayed or captured, and how the data should be grouped. This is consistent with the semantic markup approach, which separates presentation from content. Markup based templates may include resource references, such as links to other Web pages or JavaScript tied to specific page events. The template designer program or module may also provide various formatting options. Formats may be defined in a file which can be extended, modified, or replaced. Formats may, for example, include formats for currency, data and/or time, social security number, zip code, and/or phone numbers. The template designer program or module may allow groups of markup based templates to be organized into workflows. The workflows may be built on the Microsoft® Workflow Foundation®. User defined declarative rules, custom activities and persistence may be supported. Workflows may be saved as XAML files.

If providing a Web based interface to a relation database system, during design time a schema generator program or module transforms a relational database to an intermediate form or representation at 402a. The schema generator program or module may, for example, execute on a workstation computer, for instance a business analyst workstation computer. Such may be based on user selections identifying certain data structures, columns, fields or data contained in the relational database.

If providing a Web based interface to a Web service system, during design time a schema generator program or module transforms the Web service to an intermediate form or representation at 402b. As noted above, the schema generator program or module may, for example, execute on a workstation computer, for instance a business analyst workstation computer. Such may be based on user selections identifying certain data structures, columns, fields or data contained in the Web services.

At 404, during design time the schema generator program or module automatically transforms the intermediate form or representation to a markup schema. The schema generator program or module may, for example, execute on a workstation computer, for instance a business analyst workstation computer.

At 406, during design time the schema generator program or module automatically generates metadata from the intermediate form or representation. As noted above, the schema generator program or module may, for example, execute on a workstation computer, for instance a business analyst workstation computer.

At 408, during design the schema generator program or module automatically generates validations from the intermediate form or representation. As noted above, the schema generator program or module may, for example, execute on a workstation computer, for instance a business analyst workstation computer.

At 410, during design time a user uses a template designer program or module to create markup based templates. The template designer program or module may, for example, execute on a workstation computer, for instance a Web developer workstation computer.

At 412, during design time a user uses the template designer to create or specify one or more workflow. As noted above, the template designer program or module may, for example, execute on a workstation computer, for instance a Web developer workstation computer.

At 414, during runtime a runtime engine generates markup based at least in part on the markup based template. The runtime engine may, for example, generate one or more markup documents to be served to a requesting client computer system. The runtime engine may be executing, for example, on an application server computer system.

At 416, during runtime the runtime engine processes one or more activities, actions, acts, steps or tasks of a defined workflow runtime. For example, the runtime engine may carry out a series of actions dictated by the business process as defined by the workflow. Such may, for example, cause the generation of a number of markup documents in a particular order or in an order dictated by collected data or end user (e.g., client) inputs. As noted above, the runtime engine may be executing on the application server.

Figure 5:
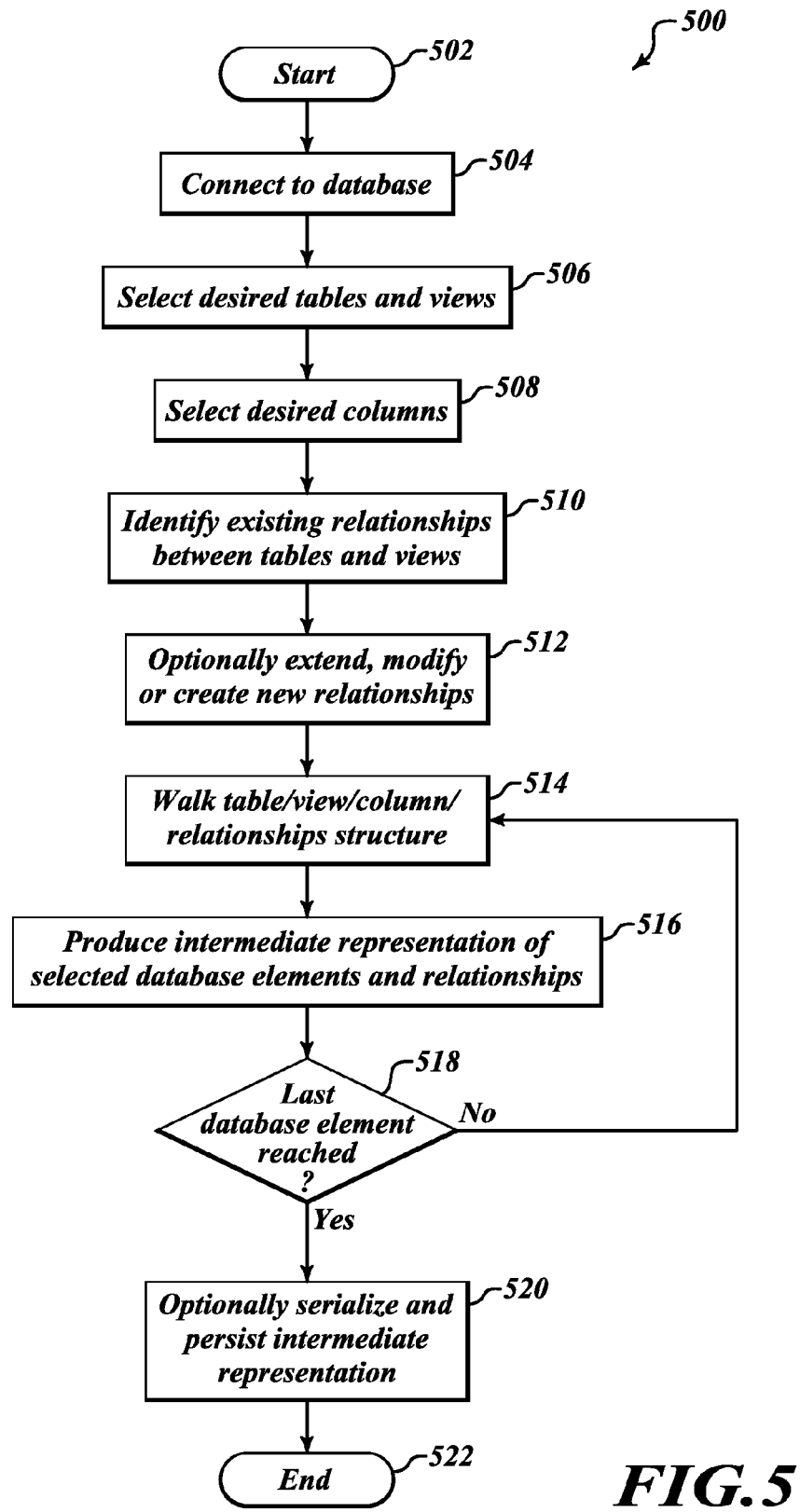
FIG. 5 is a flow diagram showing a method of transforming a relational database to an intermediate form or representation according to one illustrated embodiment.

FIG. 5 shows a low level method 500 of operating one or more computer systems of a networked environment to implement a portal function that provides a Web based interface to legacy systems and databases, according to one illustrated embodiment. The method 500 may, for example, be employed in transforming a relational database to an intermediate form or representation (402a of method 400, FIG. 4). The method 500 is specifically for use where the source is a relational database.

The method 500 starts at 502, for example in response to a call by another program or module. The method 500 is performed in preparation of generating or producing schema, metadata and validations.

At 504, the schema generator program or module executing on a workstation connects to the target relational database of a back office system via a database server. Such may be accomplished through standard database connection mechanisms from the .NET platform.

At 506, the user may be allowed to select one or more tables and/or views that are configured in the target relational database. The schema generator program or module may have read the tables and views from the database catalog and presents the user with the tables and views for selection, for example via a graphical user interface.

At 508, the user may further refine each of the selected entities (e.g., tables, views), for example by selecting specific columns in a table which the user would like to include in the markup language based schema.

At 510, the schema generator determines what relationships are already defined in the relational database for the selected entities. The schema generator creates those relationships in an appropriate format.

Optionally at 512, the schema generator provides the user with the ability to specify relationships, for example by extending or modifying existing relationships or by creating new relationships. For instance, one or more relationships may not have been explicitly defined in the relational database, but nonetheless exists or are true, or exists or are true in a specific business process to which the schema is related. For example, child/parent relationships for tables may be setup, which in an XML schema creates a nested hierarchy in the schema. Also for example, reference relationships may be set up that would specify that if a value occurs in one part of the schema, a different part of the schema must be accessed to determine what the value in the first part means since the value in the first part is actually referencing something somewhere else in the schema. The user may also specify relationships for deletion, for example relationships that do not make sense in the specific business context. Thus, the schema generator provides the user with the ability to extend the database to provide more context for a specific business process.

At 514, the schema generator walks through by table, view, column, relationship structure, transforming or producing an intermediate format or representation at 516. The intermediate format or representation may be a proprietary format. The intermediary format can take a variety of forms, but should include everything that is required to create the markup language based schema, metadata, and validations. Thus, the schema generator generates the intermediary format or representation directly from the relational database or the WSDL. Where the source is a relational database, the schema generator will simply loop through all elements which the user has selected and any user specified or selected relationships that may have been added, while omitting any relationships that the user has specified or selected to be deleted. At 518, the schema generator determines if a last database element has been reached, walking the database elements until a last element has been processed.

Optionally at 520, the schema generator may serialize and persist the intermediate format or representation. The user may chose to persist the intermediate format or representation, for example to a storage medium such as a disc. This allows later use of the intermediate format or representation or permits changes to be made thereto. Alternatively, control may return to the next act in method 400 (FIG. 4) for immediate processing.

The method 500 terminates at 522, for example until called again by some calling routine.

Figure 6:
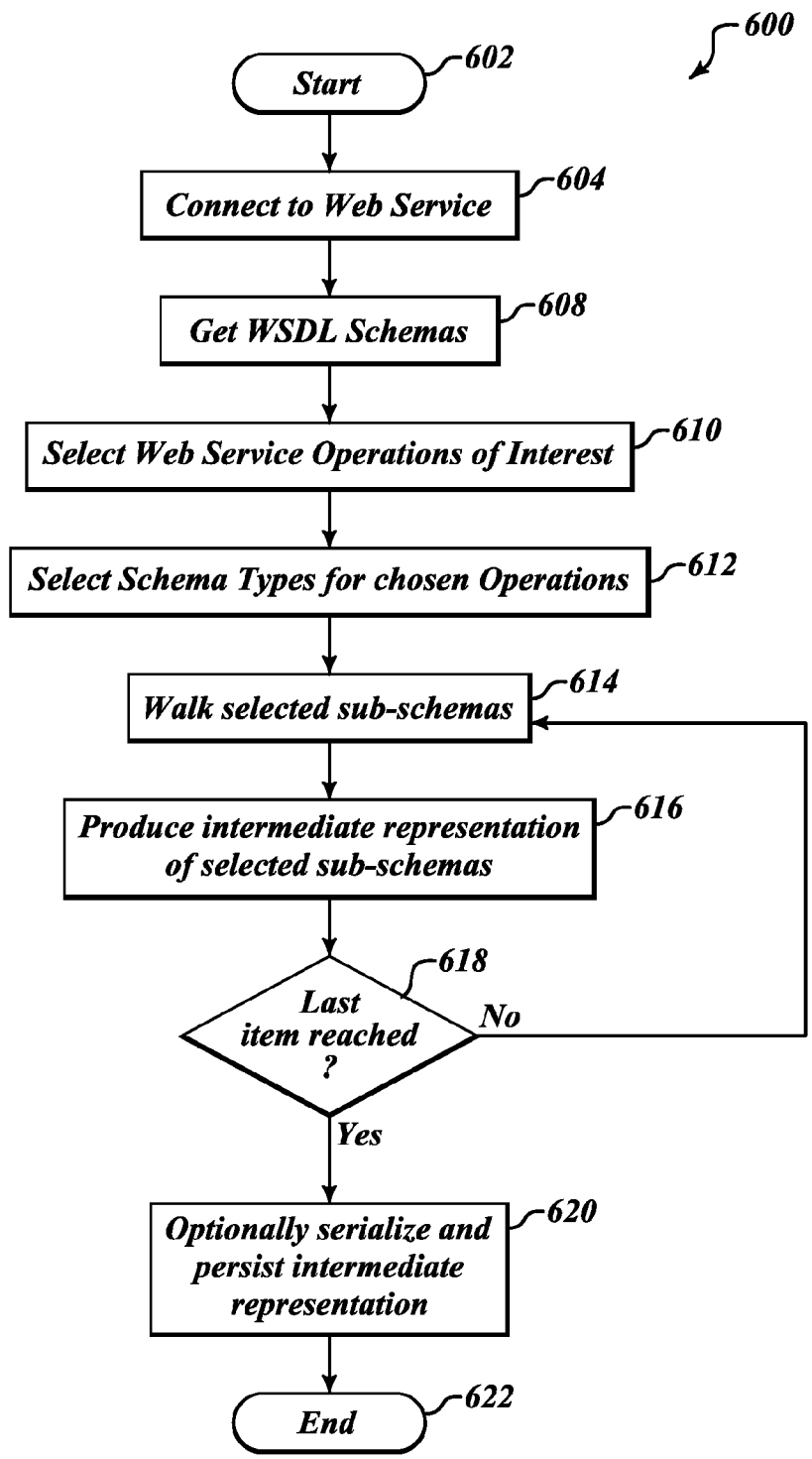
FIG. 6 is a flow diagram showing a method of transforming a Web service process to an intermediate form or representation according to one illustrated embodiment.

FIG. 6 shows a low level method 600 of operating one or more computer systems of a networked environment to implement a portal function that provides a Web based interface to legacy systems and databases, according to one illustrated embodiment. The method 600 may, for example, be employed in transforming a Web service process to an intermediate form or representation (402b of method 400, FIG. 4). The method 600 is specifically for use where the source is a Web service.

The method 600 starts at 602, for example in response to a call from a calling routine, program or module. The method 600 is performed in preparation of generating or producing schema, metadata and validations.

At 604, a schema generator program or module connects to a Web service. In particular, the schema generator program or module may allow the user to specify a mechanism to connect to that Web service.

At 608, the schema generator program or module reads the Web service definition language (WSDL) file, pulling out the schemas that are present in the WSDL file.

All of the schemas may not be germane to a business problem that is being addressed by the creation of the schema and the portal. Hence, at 610 the schema generator program or module allows the user to select various operations that are inside that WSDL that are of interest to the user. At 612, the schema generator program or module allows the user to select various schema types for the selected operations.

At 614, the schema generator program or module processes the schemas and selected operations by walking through the selected schemas, the selected operations and the sub-schemas, and producing an intermediate format or representation at 616. The schema generator program or module parses such into the intermediate format or representation, in a fashion similar to the processing from a relational database. The elements already are sub-schemas or partial schemas and there is a Web service that depends on the existing form of the schema. To ensure that the Web service can continue to use the schema, the user is provided with little or no ability to modify the schema. At 618, the schema generator program or module determines if a last item has been reached, looping through the sub-schemas.

Optionally at 620, the schema generator program or module allows the user to serialize and persist the resultant intermediary format or representation, for example being saved to a storage medium such as a disc, for later use or modification. Alternatively, control may return to the next act in method 400 (FIG. 4) for immediate processing.

The method 600 terminates at 622, for example until called again by some calling routine.

Figure 7:
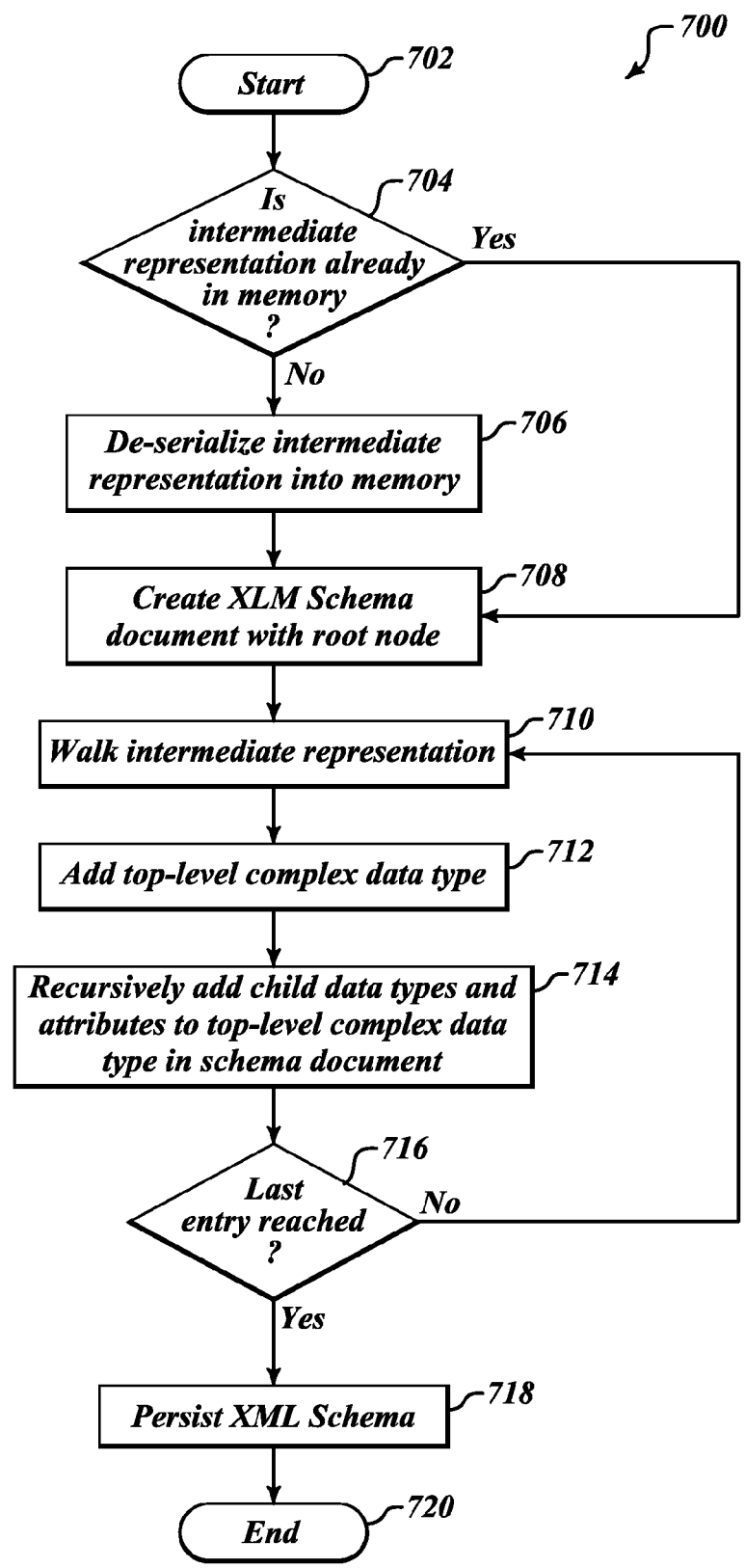
FIG. 7 is a flow diagram showing a method of transforming the intermediate form or representation to a markup schema according to one illustrated embodiment.

FIG. 7 shows a low level method 700 of operating one or more computer systems of a networked environment to implement a portal function that provides a Web based interface to legacy systems and databases, according to one illustrated embodiment. The method 700 may, for example, be employed in transforming the intermediate form or representation to a markup schema (404 of method 400, FIG. 4).

The method 700 starts at 702, for example in response to a call by another program or module.

As background, the end result of the methods 500, 600 (FIGS. 5 and 6) is that items of interest have been characterized and captured in an intermediate format or representation, whether from a relational database or a Web service definition.

At 704, the schema generator program or module determines whether there is an intermediate format or representation already persisted in a storage medium. If there is a persisted version, at 706 the schema generator program or module de-serializes the intermediate format or representation on memory. Alternatively, method 700 may be performed using an intermediate format or representation created by the method 500 or 600 without having been persisted.

At 708, the schema generator program or module creates a markup language (e.g., XML) schema document with a root node. The structures that are used in the intermediate format or representation capture the hierarchy of the elements in the underlying schema and how those elements relate to one another. There is typically a root node. The root node may be considered to be somewhat outside of the process, and may be related to a business process being addressed. The user may identify or select the root node. For example, the user may indicate an element that is the first instance or type of element that the document as a whole should be known. For instance, is the subject a personal automobile insurance policy, a rate request, or a billing summary, etc. The schema generator program or module can create the document starting with the specified root node.

Based on the structures and the understanding of how the structures interrelate in the intermediate format or representation, children can be added to the root node. In particular, at 710 the schema generator program or module walks through the intermediate format or representation, adding top level complex data type at 712 and recursively adding child data types and attributes to the top level complex data type in the schema document at 714. The schema generator program or module walks the children in the intermediate format or representation to determine what are essentially root level items. That is the schema generator program or module determines or identifies children of the root items that have no other parent, and therefore must be derived from the root, or must be children of the direct root. The schema generator program or module walks each of those root level items and adds those items to the root. In turn, the items that are being added likely also have children. Thus, the process continues iteratively so that the schema generator program or module determines any children of the current item by looking at the intermediate structures, the hierarchy and relationships. Those children are added to the respective parents. The process loops, continually going farther down the schema until an element is found which has no more children. The schema generator program or module then returns or "bubbles" back up to find the next highest item that had children, and walks down that path until the end of this hierarchy is reached. At 370, the schema generator program or module determines whether a last entry is reached. If a last entry has been reached, there should be a fully formed and correct markup language (e.g., XML) based schema, which conforms to set standards.

Optionally at 718, the schema generator program or module may persist the resultant markup language based schema, for example saving such to a computer-readable storage medium for later use or modification.

The method 700 terminates at 720, for example until called again by some calling routine.

Figure 8:
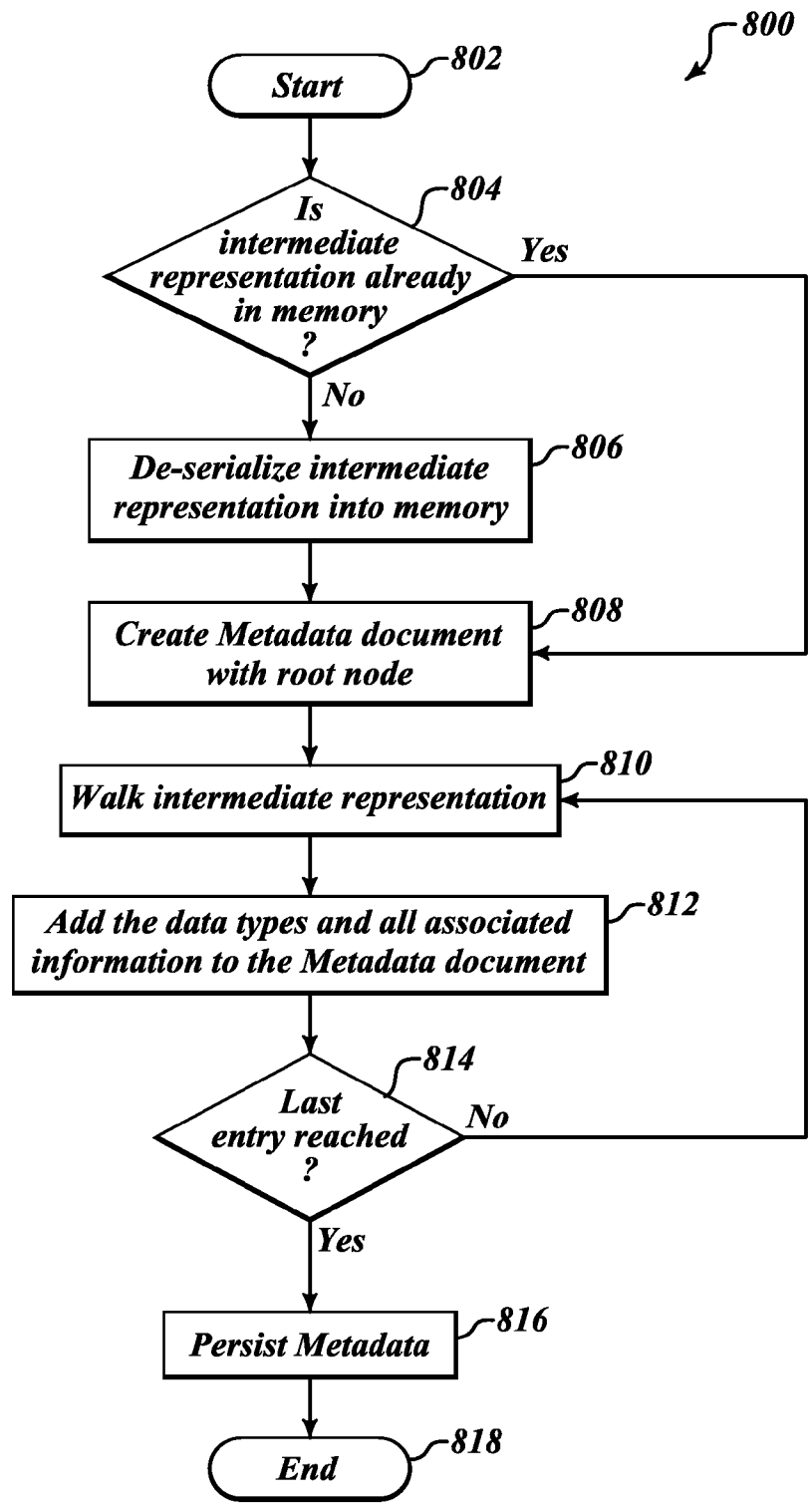
FIG. 8 is a flow diagram showing a method of generating metadata files from the intermediate form or representation according to one illustrated embodiment.

FIG. 8 shows a low level method 800 of operating one or more computer systems of a networked environment to implement a portal function that provides a Web based interface to legacy systems and databases, according to one illustrated embodiment. The method 800 may, for example, be employed in generating metadata files from the intermediate form or representation (406 of method 400, FIG. 4).

As background, the metadata facilitates the process by avoiding the need to deal directly with the schema and code as well as captured things that just cannot be captured inside the XML schema. Thus, everything that is in the schema is represented in the metadata document or file in some form, but not vice-versa. The metadata is not in the same form as the schema, and is not a duplicate or even a direct extension of the schema. Rather, the metadata is a refining or a recasting of the schema in a format that facilitates working with the schema and the XML data later in the processing. The metadata document or file captures an understanding of the schema, and allows quick access to relationships between the various elements as well as additional information that the schema cannot represent. The structure of the metadata may be fairly flat and is not hierarchical. However, the metadata captures the hierarchy in relational information. The metadata document or file is created or generated by processing each element in the schema, item by item, and capturing additional information about the element. Information that is in the schema (e.g., name, data type) is also in the metadata document or file. Such simplifies the process. In particular, it is easier to find desired information in the metadata document or file at run time, than it is to load and parse the schema at run time and then query the schema. Additionally, the metadata document or file may contain information that is germane to the portal process but which is not contained in the schema.

The method 800 starts at 802, for example in response to a call by another program or module.

At 804, the schema generator program or module determines whether there is an intermediate format or representation already persisted in a storage medium. If there is a persisted version, the schema generator program or module may prompt a user to load the persisted version. At 806, the schema generator program or module de-serializes the intermediate format or representation on memory. Alternatively, method 800 may be performed using an intermediate format or representation created by the method 500 or 600 without having been persisted.

At 808, the schema generator program or module creates a metadata document or file with a root node.

At 810, the schema generator program or module walks through the schema, in a fashion similar to the fashion previously described. Such walk through does not produce any sort of hierarchy. The schema generator program or module starts at or proximate a top. At 812, the schema generator program or module adds all the data types and all of the associated information that can be captured into the metadata document. Such may, for example, include information about valid values for a given item, if such can be determined through the database. Relationships may also be captured there, but in a different format. Part of this process also produces stored procedures and the information on what the stored procedures are called and what keys are used for retrieving or calling the stored procedures. At 814, the schema generator program or module determines if a last entry has been reached. The schema generator program or module loops, iterating down one item at a time, creating a very flat structure.

Optionally at 816, the schema generator program or module persists the metadata file, for example storing such to a computer-readable storage medium for later use or modification.

The method 800 terminates at 818, for example until called again by some calling routine.

Figure 9:
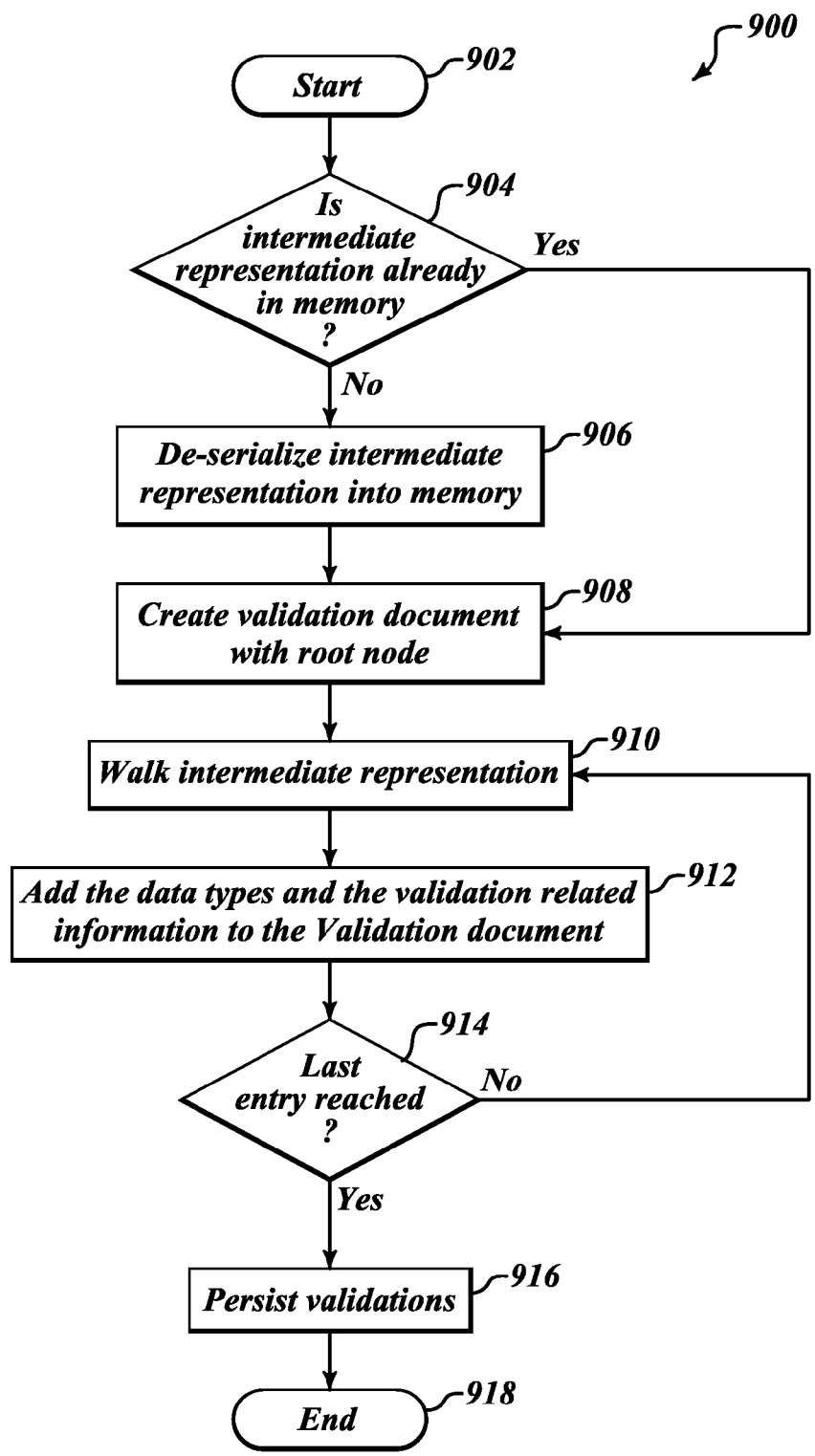
FIG. 9 is a flow diagram showing a method of generating validation files from the intermediate form or representation according to one illustrated embodiment.

FIG. 9 shows a low level method 900 of operating one or more computer systems of a networked environment to implement a portal function that provides a Web based interface to legacy systems and databases, according to one illustrated embodiment. The method 900 may, for example, be employed in generating validation files from the intermediate form or representation (408 of method 400, FIG. 4).

As background, the validation documents or files may be similar to the metadata documents or files in that both include information that the schema does not contain, or in some cases that the schema does contain. The validation document or file is a recasting of the information from the schema in a specific format which facilitates usage at run time and at design time. Typically, there will not be any information in the validation documents or files that is not also in the metadata documents or files. Thus, there may not be any additional or new information in the validation documents or files, rather the information is formatted in a way to facilitates its usage in performing validations. Similar to the metadata documents or files, the information in the validation documents or files needs to be readily accessible. In contrast to the metadata documents or files, the information in the validation documents or files needs to formatted to allow for execution of validations. In other words, while all of the information is available in the metadata documents or files, use of the metadata documents or files to perform validations at run time would be very process-intensive. Such would require iterating through the validation information that is contained in the metadata documents or files. Instead, the validation documents or files take all the information used for validation, and puts that information together into xpath statements that can be quickly evaluated at runtime through typical xpath and XML operations that are performed. Such may increase performance. The process of creating the validation documents or files is similar in some respect to the creation of the metadata documents or files.

The method 900 starts at 902, for example in response to a call by another program or module.

At 904, the schema generator program or module determines whether there is an intermediate format or representation already persisted in a storage medium. If there is a persisted version, the schema generator program or module may prompt a user to load the persisted version. At 906, the schema generator program or module de-serializes the intermediate format or representation on memory. Alternatively, method 900 may be performed using an intermediate format or representation created by the method 500 or 600 without having been persisted.

At 908, the schema generator program or module creates a validation document or file with a root node. The root node may be something that ties a particular business process with the validations for that business process.

At 910, the schema generator program or module walks through the schema, in a fashion similar to the fashion previously described. At 912, the schema generator program or module adds data types and validation related information to the validation document or file. The schema generator program or module loops, until schema generator program or module determines that a last entry has been reached at 914. Hence, the schema generator program or module iterates through the intermediate format or representation, finding all of the items or elements that are defined in that structure, pulling out, parsing, and creating the validations that are used to validate those items or elements. The resultant validation documents or files include the information used to validate that all of the information is correct (i.e., consistent with the schema) as well as validate any additions that the metadata has added.

Optionally at 916, the schema generator program or module persists the validation document or file, for example storing such to a computer-readable storage medium for later use or modification.

The method 900 terminates at 918, for example until called again by some calling routine.

At this point, a markup language (e.g., XML) schema should be available along with a metadata document or file and validation document or file that are associated with that markup language schema. Such may be used by the design time processes to create templates, and by the runtime processes as well.

Figure 10:
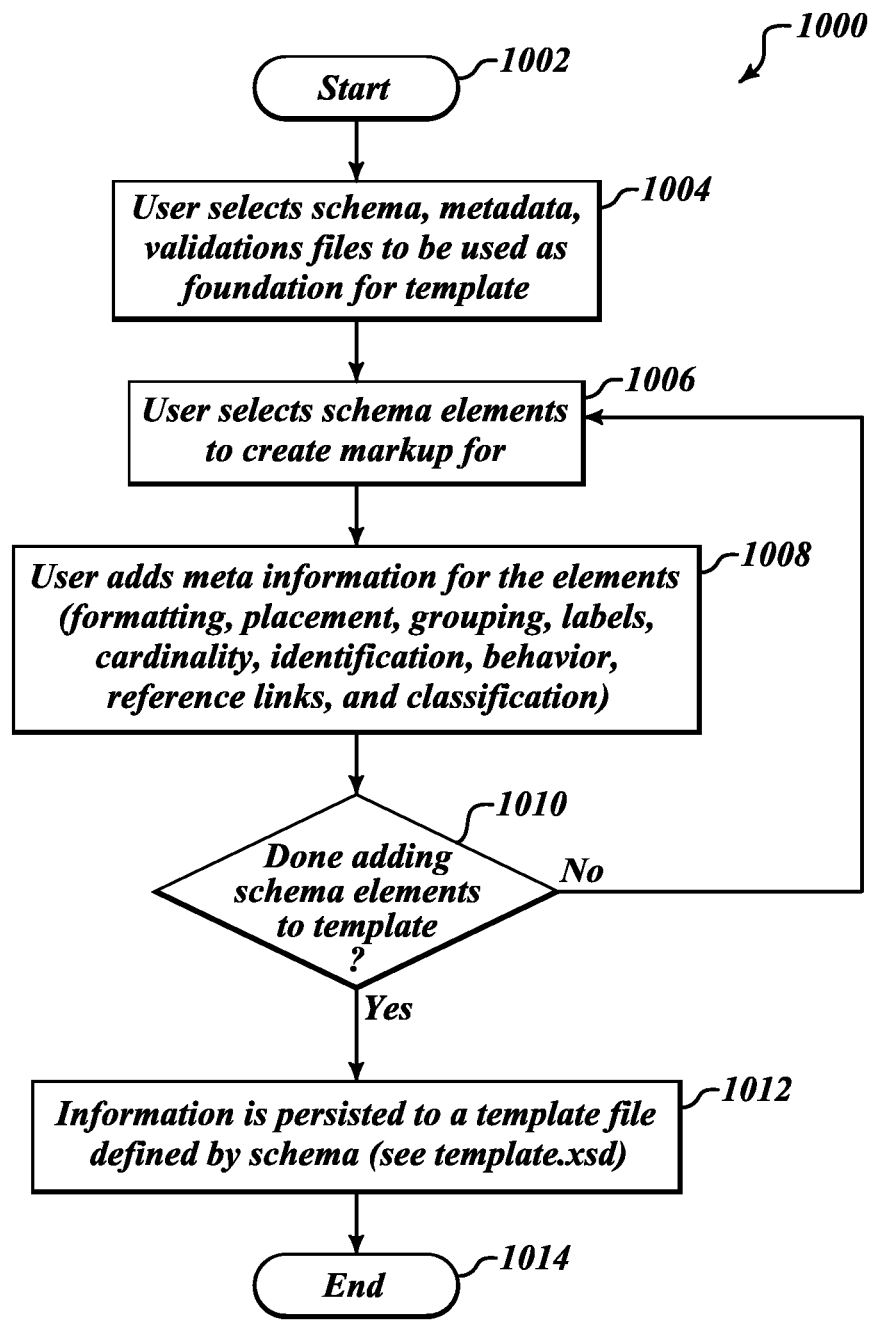
FIG. 10 is a flow diagram showing a method of creating markup based templates or transforming markup language schema, metadata and validations to markup based templates according to one illustrated embodiment.

FIG. 10 shows a low level method 1000 of operating one or more computer systems of a networked environment to implement a portal function that provides a Web based interface to legacy systems and databases, according to one illustrated embodiment. The method 1000 may, for example, be employed in creating markup based templates (410 of method 400, FIG. 4) or transforming markup language schema, metadata and validations to markup based templates which can be used to generate multiple markup language documents.

As background, the method 1000 may transform XML schema, metadata documents and validation documents into markup language (e.g., XML) templates used to generate multiple markup language documents. The method 1000 is part of the design time process which results in an XML file called a markup language based template or template.

The method 1000 starts at 1002, for example in response to a call by another program or module.

At 1004, a template designer program or module executing on a workstation computer system allows a user to select schema, metadata, and validation documents or files to be used as a foundation for the template. The user identifies or selects specific ones of the previously created or generated schema, metadata, and validation documents or files.

At 1006, the template designer program or module allows the user to select specific schema elements for which markup will be created. The user may select from any of the existing schema elements, which may be displayed in a palette or menu in a graphical user interface. In particular, the user would select those elements out of the schema, and locate the selected elements into the template and begin building up the process.

At 1008, the template designer program or module allows the user to add meta information for the element. For example, the user may specify how data will be formatted, placement of data, grouping of data, labels, cardinality, i.e., the order in which items will appear, basic WYSIWYG type presentation features, identifiers, and/or some basic behavioral characteristics).

At 1010, the template designer program or module allows the user to indicate that the user is finished adding schema elements. Thus, the template designer program or module loops until all schema elements have been identified and meta information added.

Optionally at 1012, the schema generator program or module persists the resultant template as an XML file, for example storing such to a computer-readable storage medium for later use or modification.

The method 1000 terminates at 1014, for example until called again by some calling routine.

The resulting XML template files may, for example, conform to the schema in Appendix 1, which is hereby incorporated by reference in its entirety.

Figure 11:
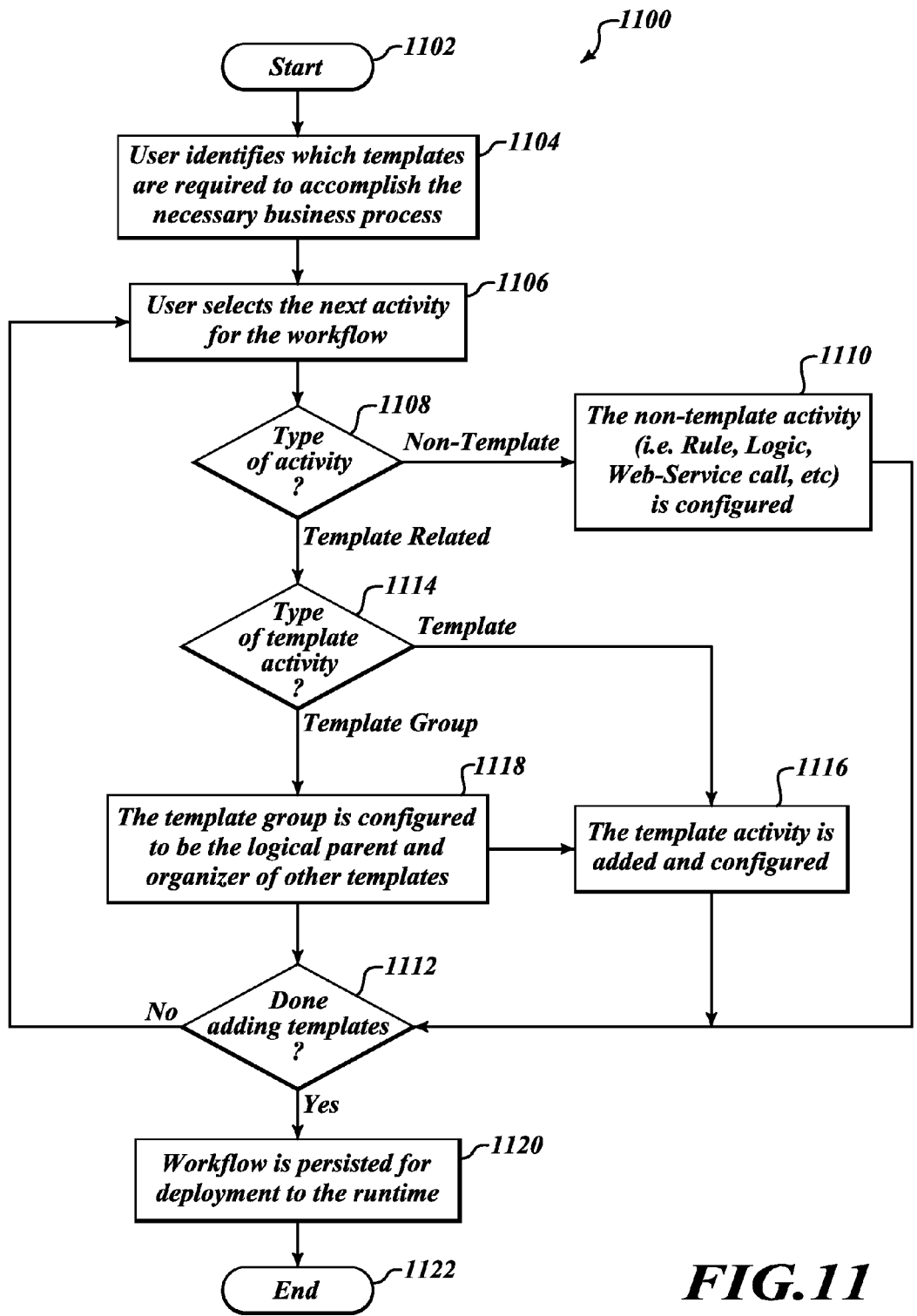
FIG. 11 is a flow diagram showing a method of creating or specifying one or more workflow according to one illustrated embodiment.

FIG. 11 shows a low level method 1100 of operating one or more computer systems of a networked environment to implement a portal function that provides a Web based interface to legacy systems and databases, according to one illustrated embodiment. The method 1100 may, for example, be employed in creating or specifying one or more workflow (412 of method 400, FIG. 4), for example business process workflows.

As background, the method 1100 create business process workflows from the markup language based templates created by the method 1000 (FIG. 10). The method 1100 is part of the design time process.

The method 1100 starts at 1102, for example in response to a call by another program or module.

At 1104, a workflow specification program or module executing on a workstation, for instance a Web developer workstation, allows a user to identify which of the templates will used in a workflow, such as a business process workflow. A variety of editors or programs (e.g., Visual studio IDE) may be employed, and the output of this process may take of variety of forms, for example a Windows Workflow®. Specifically, the output will be a portal server workflow that has a certain defined structure.

At 1106, the workflow specification program or module allows the user to select activities, actions, acts, steps or tasks for the workflow. In the creation of a workflow for use with the portal server, the user might start off with a portal server activity. The portal server activity may be a container activity, in which all of the identified templates and different business process activities or actions will logically reside or be grouped within. The user would thus add a template act activity to the workflow that represents an action, act, step or task in the workflow.

At 1108, workflow specification program or module determines a type for the activity. If the type for the activity selected by the user is a non-template related type, control passes to 1110, while control passes to 1114 if the type of the activity is a template related type.

If the type of activity is non-template related, then the activity may be a rule or logic based activity or other activity that the user wants to have happen at that particular point in the workflow. At 1110, the non-template related type activity is configured.

If the activity is a template related activity, at 1114 the workflow specification program or module determines whether the activity is related to a template group or an individual template.

If the activity is related to an individual template, the workflow specification program or module adds and configures the activity to the workflow at 1116. If an activity (i.e., act or step) being added to a workflow is template related, then a get markup activity is added to the template related activity. The get markup activity knows how to use markup language based templates, such as those created by the method 1000 (FIG. 10). The get markup activity is configured to point to a particular markup language based template, and also to indicate which data will be used by the runtime engine to populate the data in that particular markup language based template.

If the activity is related to a group of templates, the workflow specification program or module configures the template group to be the logical parent and organizer of the templates in the workflow at 1118. The workflow specification program or module provides the user with the ability to indicate to the portal server runtime engine if this is going to be a series of acts or steps which should be grouped together in the process. Where there are multiple markup language based templates that are editing data on one entity in the data, these markup language based templates are grouped together so that the portal server can keep track of the states across those templates because there are separate actions, acts or steps in the process. An example of such would be several acts or steps that someone would go through to add information regarding an insured driver or an insured vehicle. If the markup language based templates do not need to be grouped together, then there typically is no reason to group such in a group activity.

At 1112, the workflow specification program or module determines whether the user is finished adding markup language based templates. Hence, the method 1100 loops, returning control to 1106 until a final markup language based template has been added to the workflow.

Optionally at 1120, the workflow specification program or module persists the resulting workflow, for example saving such to a computer-readable storage medium as an XOML file, for later user, for instance during runtime. XOML files are Windows Workflow files, which are essentially XML files.

The method 1100 terminates at 1122, for example until called again by some calling routine.

Figure 12:
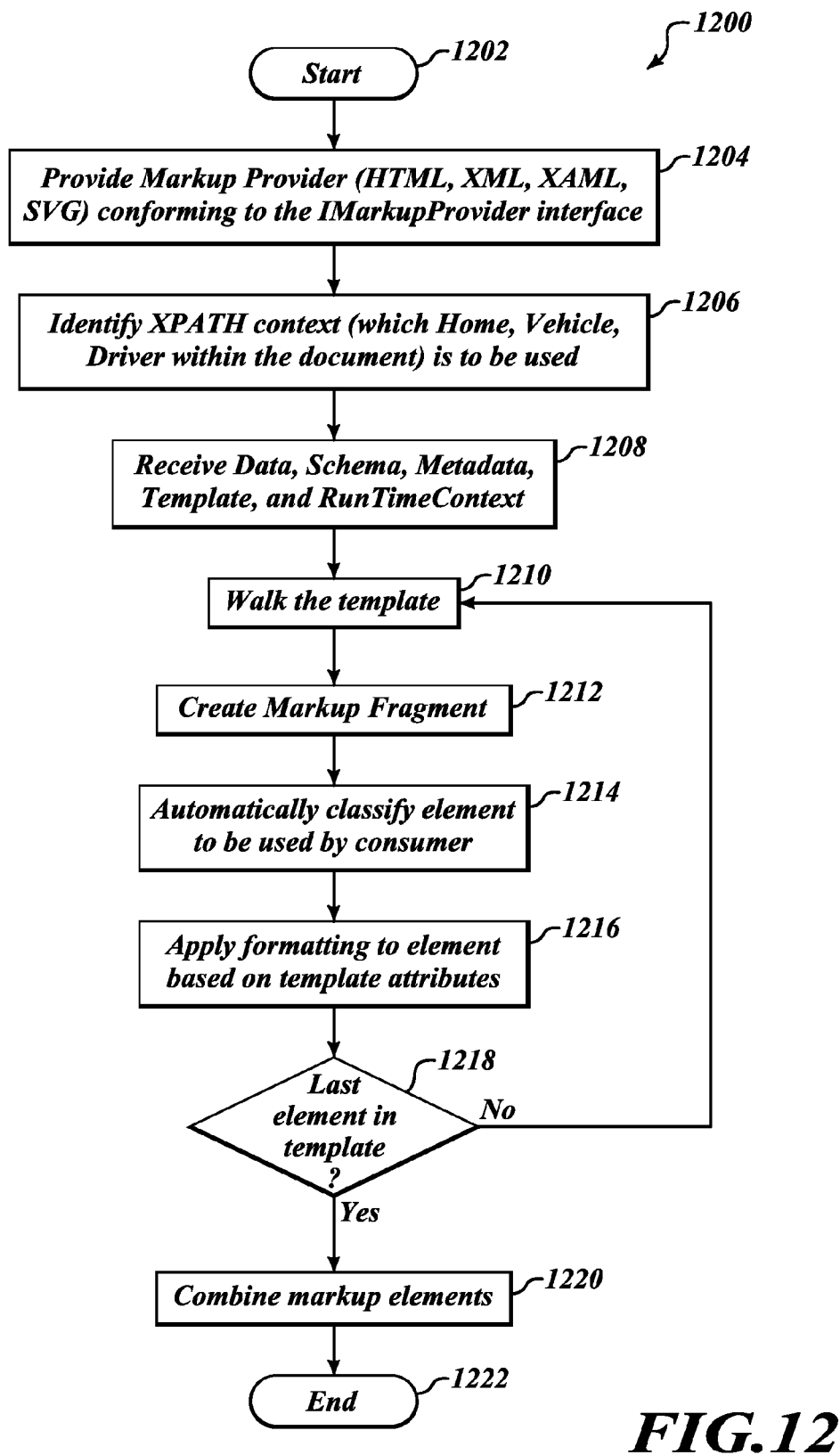
FIG. 12 is a flow diagram showing a method of transforming markup language templates into markup language documents or generating markup documents based at least in part on the markup based template according to one illustrated embodiment.

FIG. 12 shows a low level method 1200 of operating one or more computer systems of a networked environment to implement a portal function that provides a Web based interface to legacy systems and databases, according to one illustrated embodiment. The method 1200 may, for example, be employed in transforming markup language templates into markup language documents or generating markup documents based at least in part on the markup based template (414 of method 400, FIG. 4).

As background, the method 1200 transforms XML templates into multiple markup language documents or files. The method 1200 is part of the runtime process, and may be performed by a portal server runtime engine executing on an application server computer system.

The method 1200 starts at 1202, for example in response to a call by another program or module.

At 1204, the portal server runtime engine receives an indication of a desired markup provider. The portal server supports providing different types of markup documents (e.g., HTML, XML). Such may be realized via various interfaces, denominated herein as markup providers. At runtime, when a call comes into the portal server Web service to generate markup, one of the parameters that the call can specify is what type of markup is being requested.

At 1206, an Xpath context is identified which specifies a source of the data which the markup provider will use to populate the template. For example, where there are multiple entities or objects involved (e.g., drivers, vehicles, homes), it may be useful to be able to specify which driver, which vehicle, or which home is insured. Such may be specified through a parameter called entity identifier (ID). The entity ID may be passed from the caller to the portal server. The markup document or file produced by the portal server makes facilitate use of such a parameter passing approach.

At 1208, the portal server runtime engine, or more specifically the markup provider, receives data, schema, metadata, template and runtime context. Thus, the markup provider has the information or data for the markup language (e.g., XML) document, including the portion of the XML document which specifically addresses the template request. That is the markup provider has the pertinent schema, metadata, template, and the runtime context which points to the pertinent portions of the data on which this particular template focuses.

At 1210, the portal server runtime engine, or more specifically the markup provider, walks through the markup language based template. For each item in the markup language based template, the markup provider begins to create markup fragments at 1212. For example, one of the valid items in a template may be a group. Thus, the markup provider converts each group to a markup fragment. Each item, each field, or each table inside of the group is then converted to a markup fragment.

At 1214, the markup provider automatically classifies the elements. For example, if the element is a field element (i.e., as to be used in a Web form), the element is classified to be used by the consumer later on in the process, for example when the consumer can attach java script behavior to the Web element.

At 1216, the markup provider may also apply any formatting, if appropriate. Thus, if formatting was defined for certain fields during the process of creating the template, the markup provider is responsible for applying the formatting.

At 1218, the portal server runtime engine determines whether a last element in a markup language based template has been processed. The process loops, returning control to 1210 until a last element in the template has been processed.

At 1220 the portal server runtime engine or the markup provider combines all of the markup elements together and returns the combined markup elements to portal server. The portal server runtime engine returns the combined markup elements back to the original caller.

The method 1200 terminates at 1222, for example until called again by some calling routine.

Markup provider configuration may conform to the schema in Appendix 2, which is hereby incorporated by reference in its entirety.

Figure 13:
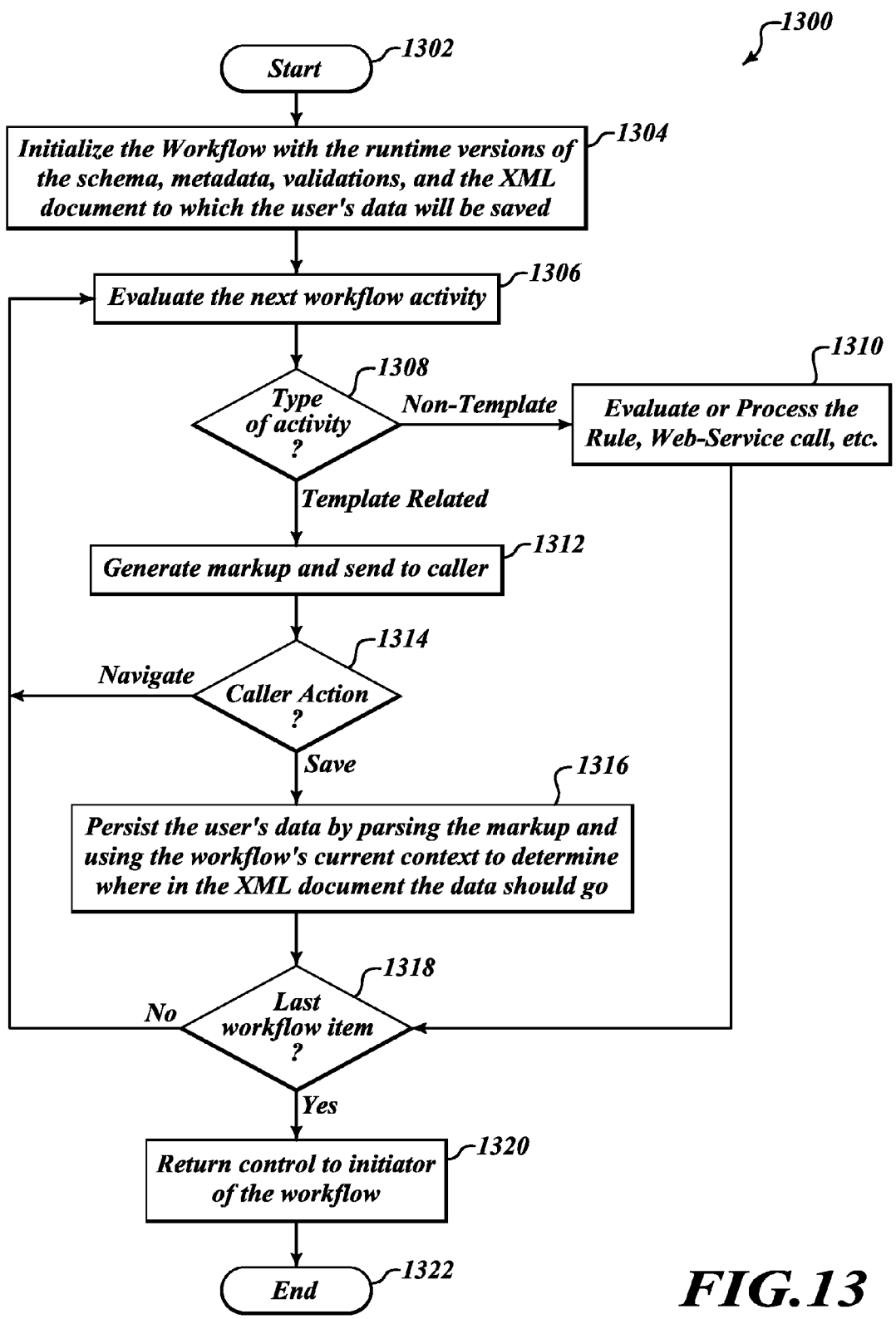
FIG. 13 is a flow diagram showing a method of processing one or more acts of a defined workflow runtime according to one illustrated embodiment.

FIG. 13 shows a low level method 1300 of operating one or more computer systems of a networked environment to implement a portal function that provides a Web based interface to legacy systems and databases, according to one illustrated embodiment. The method 1300 may, for example, be employed in processing one or more acts of a defined workflow runtime (416 of method 400, FIG. 4), for example business process workflows.

As background, the method 1300 interprets and processes the workflow and runtime. Thus, the method 1300 is a runtime process, and may be performed by a portal server runtime engine executing on an application server computer system.

The method 1300 starts at 1302, for example in response to a call by another program or module. For example, in order to use portal server workflows and templates together, a caller would make a call to portal server, specifically a call to start a workflow.

At 1304, in response to a call, the portal server runtime engine creates an instance of the workflow and initializes the workflow with the runtime versions of the schema, metadata, and validation documents or files, as well a the XML document or file to which the data input by the user will be saved. The portal server runtime engine starts the workflow with data, for example default data, and makes sure that the schema, metadata, and validation documents or files are available to the workflow.

After the workflow has been started, the caller may place other calls to get markup against a particular workflow. The caller may, for example, pass a page number to indicate which activity, action, act, step or task in workflow for which the caller wants to markup generated. Alternatively, the call may simply request markup generation, leaving the runtime engine to determine which one of the activities, actions, acts, steps or tasks in the workflow for which the markup will be generated.

At 1306, the portal server runtime engine iterates through the activities, actions, acts, steps or tasks for a workflow. In most cases, portal server runtime engine will be starting with the first activity, action, act, step or task in the workflow. No matter which activity in the workflow, at 1308 the portal server runtime engine process determines a type for the activity, action, act, step or task. Control passes to 1310 if the type in indicates a non-template related activity, while control passes to 1312 if the type indicates a template related activity.

If the activity, action, act, step or task is a non-template related activity, at 1310 the portal server runtime engine executes or otherwise performs the activity. For example, if the activity is a rule or rule based, the activity is processed. Also for example, if the activity is a Web service call, the Web service call is processed. Control then passes to 1318.

If the activity, action, act, step or task is a template related activity, at 1312 the portal server runtime engine generates markup and sends the generated markup to the caller. One of the rules of using portal server workflows is that an execution of an act or step results in the production or generation of some markup. Where that activity type is a template related markup, the markup is generated by using the markup language based template and the data that the workflow stores. This may be accomplished by passing the task to the requested markup provider and performing method 1200 (FIG. 12), which returns markup back to the workflow.

At 1314, portal server runtime engine determines whether there are any actions by the caller. For example, the caller may perform navigation in the markup, in which case control may return to 1306. At 1316, the portal server runtime engine persists data entered by the user, if any, using the current context of the workflow to determine where to place the data in the XML document. Control then passes to 1318.

At 1318, the portal server runtime engine determines whether the activity is a last workflow item. If the activity is not the last workflow item, control returns to 1306, where the process loops until the last workflow item is processed. At 1320, the workflow returns the markup back to the indicator or the initiator of the workflow.

Calls to the workflow may cause performance of other actions in addition to generating markup. For example, the workflow may be persisted, for example being stored to a computer-readable medium. Where the generated markup is a Web form to capture data from a user or to allow for data entry, the caller or initiator of the workflow is responsible for capturing the data posted to the form, calling for a save workflow, and passing the posted form data to the portal server. When such a save request message is sent to portal server, portal server runtime engine is responsible for persisting the data into the workflow data itself.

Also for example, a navigation request may be received. A navigation request may, for instance, indicate that a user would like to receive navigation markup for the portal server activity, or for the workflow. The portal server runtime engine determines how the workflow is structured or constructed and returns markup which indicates how the workflow has been constructed. Such may allow a user to navigate through the workflow, and may also indicate which activity is currently active or the current activity, action, act, step or task in the workflow in which the user is currently working.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to portal server systems, not necessarily the exemplary insurance industry related portal server system generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any computer-readable medium for use by or in connection with any processor-related system or method. In the context of this disclosure, a memory is a computer-readable medium that is an electronic, magnetic, optical, or other physical device or means that contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any physical element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape. Note that the computer-readable medium could even be paper or another suitable medium upon which the program associated with logic and/or information is printed, as the program can be electronically captured, via for instance optical scanning of the paper or other medium, then compiled, interpreted or otherwise processed in a suitable manner if necessary, and then stored in memory.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operating at least one computer system, the method comprising:

transforming a schema to an intermediate representation by at least one processor;

transforming the intermediate representation of the schema to a markup language based schema by at least one processor;

transforming the intermediate representation of the schema to a number of metadata files by at least one processor;

transforming the intermediate representation of the schema to a number of validation files by at least one processor;

generating a number of markup language templates by at least one processor based at least in part on the markup language based schema, the metadata files and the validation files;

initializing a business process workflow with a run time version of each of the intermediate representation of the schema, the metadata files and the validation files and a markup language file to which a set of user data will be saved;

iterating, by at least one processor, through a plurality of activities of the business process work flow; and generating, by at least one processor, a number of markup documents if the respective one of the activities is template related; and persisting the user data.

2. The method of claim 1 wherein transforming a schema to an intermediate representation includes transforming at least one of a relational database or a Web Service to the intermediate representation of a number of selected elements of the relational database or the Web Service.

3. The method of claim 1 wherein transforming a schema to an intermediate representation comprises:

identifying a number of existing relationships between a number of selected tables and views of a relational database by at least one processor;

iterating through a number of table, view, and column relationships by at least one processor; and producing the intermediate representation of the table, view, and column relationships for selected ones of the tables, views and columns of the relational database by at least one processor.

4. The method of claim 3 wherein transforming a schema to an intermediate representation further comprises:

receiving a number of signals indicative of a plurality of user selections of the selected tables and views of the relational database; and receiving a number of signals indicative of a plurality of user selections of the selected columns of the relational database.

5. The method of claim 3 wherein transforming a schema to an intermediate representation further comprises:

at least one of deleting one of the relationships, modifying one of the relationships or creating a new relationship by at least one processor.

6. The method of claim 3 wherein transforming a schema to an intermediate representation further comprises:

serializing the intermediate representation by at least one processor; and persisting the intermediate representation by at least one processor.

7. The method of claim 3 wherein transforming a schema to an intermediate representation comprises:

retrieving by at least one processor a number of Web Service Definition Language schemas;

selecting by at least one processor a number of schema types logically associated with respective ones of a number of selected Web Service operations of the Web Service Definition Language schemas;

iterating through a number of selected sub-schemas; and producing the intermediate representation based at least in part on the selected sub-schemas.

8. The method of claim 7 wherein transforming a schema to an intermediate representation further comprises:

receiving a number of signals indicative of a plurality of selections of the Web Service operations.

9. The method of claim 7 wherein transforming a schema to an intermediate representation further comprises:

serializing the intermediate representation by at least one processor; and persisting the intermediate representation by at least one processor.

10. The method of claim 1 wherein transforming the intermediate representation of the schema to a number of metadata files comprises:

creating at least one metadata file having a root node by at least one processor;

iterating through the intermediate representation by at least one processor;

adding a number of data types and associated information to the at least one metadata file by at least one processor; and persisting a resultant metadata file.

11. The method of claim 10 wherein transforming the intermediate representation of the schema to a number of metadata files further comprises:

de-serializing by at least one processor the intermediate representation if a previously created version of intermediate representation has been stored and is available, before creating the metadata file.

12. The method of claim 1 wherein generating a number of markup language templates comprises:

receiving number of signals indicative of identities of each of a number of user selections of one or more schema, one or more pieces of metadata, and a one or more validation files to be used for creating the markup language based templates;

receiving signals indicative of a number of user selections of schema elements;

adding meta information for the selected schema elements including at least one of a formatting, a placement, a grouping, a label, a cardinality, an identification, a behavior, a reference link, or a classification; and persisting information to a markup language based template file defined by the schema.

13. The method of claim 1 wherein transforming the intermediate representation of the schema to a number of validation files comprises:

creating a set of validation information from the schema the validation information indicative of semantic correctness of data.

14. The method of claim 13 wherein creating a set of validation information from the schema comprises:

iterating through the intermediate representation of the schema by at least one processor;

adding at least one data type and at least one piece of validation related information to at least one validation file by at least one processor; and persisting the at least one validation file.

15. The method of claim 14 wherein creating a set of validation information from the schema further comprises:

de-serializing by at least one processor the intermediate representation if a stored intermediate representation is available, before iterating through the intermediate representation.

16. The method of claim 1, further comprising:

generating a number of markup language based files by at least one processor based at least in part on the generated markup language templates.

17. The method of claim 16 wherein generating a number of markup language templates is performed by a first processor during a pre-run time, and generating a number of markup language based files is performed by second processor at a run time, the run time following the pre-run time.

18. The method of claim 1, further comprising:

generating by at least one processor the business process workflow using the markup language templates.

19. The method of claim 1 wherein persisting the user data comprises:

parsing the markup documents and using workflow current context to determine respective locations in the markup documents for respective pieces of the user data.

20. A method of operating at least one computer system, the method comprising:

transforming a schema to an intermediate representation by at least one processor;

transforming the intermediate representation of the schema to a markup language based schema by at least one processor;

transforming the intermediate representation of the schema to a number of metadata files by at least one processor;

transforming the intermediate representation of the schema to a number of validation files by at least one processor; and generating a number of markup language templates by at least one processor based at least in part on the markup language based schema, the metadata files and the validation files, wherein the transforming the schema to the intermediate representation comprises:

identifying a number of existing relationships between a number of selected tables and views of a relational database by at least one processor;

iterating through a number of table, view, and column relationships by at least one processor; and producing the intermediate representation of the table, view, and column relationships for selected ones of the tables, views and columns of the relational database by at least one processor, and wherein the transforming the intermediate representation to the markup language based schema comprises:

creating by at least one processor an XML schema file having a root node;

iterating through the intermediate representation by at least one processor;

adding by at least one processor a top-level complex data type to the XML schema file;

recursively adding a number of child data types and a number of attributes to the top-level complex data type in the XML schema file by at least one processor; and persisting a resultant XML schema file.

21. The method of claim 20 wherein transforming an intermediate representation to a markup language based schema further comprises:

de-serializing by at least one processor the intermediate representation if the intermediate representation has been previously stored and is available, before creating the XML schema file.

22. A method of operating at least one computer system, the method comprising:

transforming a schema to an intermediate representation by at least one processor;

transforming the intermediate representation of the schema to a markup language based schema by at least one processor;

transforming the intermediate representation of the schema to a number of metadata files by at least one processor;

transforming the intermediate representation of the schema to a number of validation files by at least one processor;

generating a number of markup language templates by at least one processor based at least in part on the markup language based schema, the metadata files and the validation files; and generating a number of markup language based files by at least one processor based at least in part on the generated markup language templates, wherein the generating markup language based files by at least one processor based at least in part on the generated markup language templates comprises:

picking a markup provider that conforms to a markup provider interface;

identifying a transit path context;

receiving at least one of a piece of data, a schema, a metadata template or a runtime context;

iterating through the markup language template;

creating at least one markup fragment based at least in part on the iterating through the markup language template;

classifying at least one markup element to be used by a consumer;

formatting at least one markup element based on attributes of the template; and combining the markup elements into at least one markup language based file.

23. A method of operating at least one computer system, the method comprising:

transforming a schema to an intermediate representation by at least one processor;

transforming the intermediate representation of the schema to a markup language based schema by at least one processor;

transforming the intermediate representation of the schema to a number of metadata files by at least one processor;

transforming the intermediate representation of the schema to a number of validation files by at least one processor;

generating a number of markup language templates by at least one processor based at least in part on the markup language based schema, the metadata files and the validation files; and generating by at least one processor at least one business process workflow using the markup language templates, wherein the generating at least one business process workflow using the markup language templates comprises:

receiving signals indicative of one or more user selections of identifying each of a number of markup language templates to be used in generating the business process workflow;

receiving signals indicative of one or more user selections identifying each of a number of activities for the business process workflow;

adding a template activity to the business process workflow if the user selection is indicative of a template activity;

configuring a template group of the business process workflow as a logical parent and organizer of other templates if the user selection is indicative of a template group activity;

configuring a non-template activity of the business process workflow if the user selection is indicative of a non-template activity; and persisting a resultant process work flow.

24. A system of communicatively coupled computers, the system comprising:

at least one computer-readable storage medium that stores processor executable instructions;

at least one processor that executes the processor executable instructions stored by the at least one computer-readable storage medium and which when executing the processor executable instructions implements:

a schema generator that transforms a schema to an intermediate representation, transforms the intermediate representation of the schema to a markup language based schema, transforms the intermediate representation of the schema to a number of metadata files, and transforms the intermediate representation of the schema to a number of validation files;

a template designer that generates a number of markup language templates based at least in part on the markup language based schema, the metadata files and the validation files; and a runtime engine that builds markup documents using at least the markup language templates that:

initializes a business process workflow with a run time version of each of the intermediate representation of the schema, the metadata files and the validation files and a markup language file to which a set of user data will be saved;

iterates through a plurality of activities of the business process work flow; and generates a number of markup documents if the respective one of the activities is template related; and persists the user data.

25. The system of claim 24 wherein the schema generator transforms at least one of a relation database or a Web service to the intermediate representation.

26. The system of claim 24 wherein the schema generator identifies a number of existing relationships between a number of selected tables and views of a relational database, iterates through a number of table, view, and column relationships, and produces the intermediate representation of the table, view, and column relationships for selected ones of the tables, views and columns of the relational database.

27. The system of claim 24 wherein the schema generator allows a user to select from at least one of deleting one of the relationships, modifying one of the relationships or creating a new relationship by at least one processor.

28. The system of claim 24 wherein the processor further implements a business processor work flow generator which applies a business work flow to the markup language templates.

29. A system of communicatively coupled computers, the system comprising:

at least one computer-readable storage medium that stores processor executable instructions;

at least one processor that executes the processor executable instructions stored by the at least one computer-readable storage medium and which when executing the processor executable instructions implements:

a schema generator that transforms a schema to an intermediate representation, transforms the intermediate representation of the schema to a markup language based schema, transforms the intermediate representation of the schema to a number of metadata files, and transforms the intermediate representation of the schema to a number of validation files;

a template designer that generates a number of markup language templates based at least in part on the markup language based schema, the metadata files and the validation files; and a runtime engine that builds markup documents using at least the markup language templates, wherein the template designer creates an XML schema file having a root node, iterates through the intermediate representation, adds a top-level complex data type to the XML schema file, recursively adds a number of child data types and a number of attributes to the top-level complex data type in the XML schema file; and persists a resultant XML schema file.

30. At least one computer-readable medium that stores instructions executable by at least one processor, which cause the at least one processor to provide a portal server function, by:
  transforming a schema to an intermediate representation by at least one processor;
  transforming the intermediate representation of the schema to a markup language based schema by at least one processor;
  transforming the intermediate representation of the schema to a number of metadata files by at least one processor;
  transforming the intermediate representation of the schema to a number of validation files by at least one processor;
  generating a number of markup language templates by at least one processor based at least in part on the markup language based schema, the metadata files and the validation files;
  initializing a business process workflow with a run time version of each of the intermediate representation of the schema, the metadata files and the validation files and a markup language file to which a set of user data will be saved;
  iterating through a plurality of activities of the business process work flow; and
  generating a number of markup documents if the respective one of the activities is template related; and
  persisting the user data.

31. The computer-readable medium of claim 30 wherein transforming a schema to an intermediate representation by at least one processor includes transforming at least one of a relational database or a Web Service to the intermediate representation of a number of selected elements of the relational database or the Web Service.

32. The computer-readable medium of claim 30 wherein transforming a schema to an intermediate representation comprises: identifying a number of existing relationships between a number of selected tables and views of a relational database, iterating through a number of table, view, and column relationships; and producing the intermediate representation of the table, view, and column relationships for selected ones of the tables, views and columns of the relational database.

33. The computer-readable medium of claim 30 wherein the instructions further cause the processor to provide a portal server function, further by:
  processing a number of signals indicative of a plurality of user selections of the selected tables and views of the relational database;
  processing a number of signals indicative of a plurality of user selections of the selected columns of the relational database; and
  processing a number of signals indicative of a user selection to at least one of delete one of the relationships, modify one of the relationships or create a new relationship.

34. The computer-readable medium of claim 30 wherein transforming the intermediate representation of the schema to a number of metadata files comprises: creating at least one metadata file having a root node by at least one processor; iterating through the intermediate representation by at least one processor; and adding a number of data types and associated information to the at least one metadata file by at least one processor.

35. The computer-readable medium of claim 30 wherein generating a number of markup language templates comprises: receiving number of signals indicative of identifies of each of a number of user selections of one or more schema, one or more pieces of metadata, and a one or more validations files to be used for creating the markup language based templates; receiving signals indicative of a number of user selections of schema elements; and adding meta information for the selected schema elements including at least one of a formatting, a placement, a grouping, a label, a cardinality, an identification, a behavior, a reference link, or a classification.

36. The computer-readable medium of claim 30 wherein the instructions cause the processor to provide a portal server function, further by:
  generating the business process workflow using the markup language templates.

37. The computer-readable medium of claim 30 wherein the instructions cause the processor to provide a portal server function, further by:
  initializing the business process workflow with a run time version of each of the intermediate representation of the schema, the metadata files and the validation files and a markup language file to which the set of user data will be saved.

38. At least one computer-readable medium that stores instructions executable by at least one processor, which cause the at least one processor to provide a portal server function, by:
  transforming a schema to an intermediate representation by at least one processor;
  transforming the intermediate representation of the schema to a markup language based schema by at least one processor;
  transforming the intermediate representation of the schema to a number of metadata files by at least one processor;
  transforming the intermediate representation of the schema to a number of validation files by at least one processor; and
  generating a number of markup language templates by at least one processor based at least in part on the markup language based schema, the metadata files and the validation files, wherein the transforming the intermediate representation to a markup language based schema comprises: creating by at least one processor an XML schema file having a root node; iterating through the intermediate representation by at least one processor; adding by at least one processor a top-level complex data type to the XML schema file; and recursively adding a number of child data types and a number of attributes to the top-level complex data type in the XML schema file by at least one processor.

* * * * *

UNITED STATES PATENT AND TRADEMARK OFFICE
CERTIFICATE OF CORRECTION

| | | |
|---|---|---|
| PATENT NO. | : 8,700,682 B2 | Page 1 of 1 |
| APPLICATION NO. | : 12/647235 | |
| DATED | : April 15, 2014 | |
| INVENTOR(S) | : Doug Tedder et al. | |

It is certified that error appears in the above-identified patent and that said Letters Patent is hereby corrected as shown below:

In the Claims

Column 32, Line 11, Claim 1:
"activities of the business process work flow; and" should read, --activities of the business process work flow;--.

Column 36, Line 24, Claim 24:
"process work flow; and" should read, --process work flow;--.

Column 37, Line 31, Claim 30:
"process work flow; and" should read, --process work flow;--.

Signed and Sealed this
Seventh Day of April, 2015

Michelle K. Lee
*Director of the United States Patent and Trademark Office*